United States Patent
Courtney et al.

(10) Patent No.: US 10,926,591 B2
(45) Date of Patent: Feb. 23, 2021

(54) INFLATION SYSTEM FOR TUBELESS TIRES

(71) Applicant: Santa Cruz Bicycles, LLC, Santa Cruz, CA (US)

(72) Inventors: Brett Robert Courtney, Menlo Park, CA (US); James Mathew Amaral, Morgan Hill, CA (US)

(73) Assignee: Santa Cruz Bicycles, LLC, Santa Cruz, CA (US)

( * ) Notice: Subject to any disclaimer, the term of this patent is extended or adjusted under 35 U.S.C. 154(b) by 0 days.

(21) Appl. No.: 16/852,292

(22) Filed: Apr. 17, 2020

(65) Prior Publication Data

US 2020/0331311 A1 Oct. 22, 2020

Related U.S. Application Data

(60) Provisional application No. 62/835,206, filed on Apr. 17, 2019, provisional application No. 62/914,041, filed on Oct. 11, 2019.

(51) Int. Cl.
*B60C 29/00* (2006.01)
*B60C 29/06* (2006.01)
(Continued)

(52) U.S. Cl.
CPC .............. *B60C 29/005* (2013.01); *B60C 5/16* (2013.01); *B60C 29/062* (2013.01);
(Continued)

(58) Field of Classification Search
CPC ....... B60C 29/005; B60C 29/062; B60C 5/16; B60C 23/0494; B60C 23/1496;
(Continued)

(56) References Cited

U.S. PATENT DOCUMENTS 499,956 A * 6/1893 Berry ...................... F16K 15/20
137/232
505,486 A * 9/1893 Schrader ................. F16K 15/20
137/234
(Continued)

FOREIGN PATENT DOCUMENTS

CN 204095150 U 1/2015
DE 10336959 A1 2/2005
(Continued)

OTHER PUBLICATIONS

Jul. 29, 2020, International Search Report and Written Opinion of the International Searching Authority from the Korean Intellectual Property Office, in PCT/US2020/028855, which is an international application corresponding to this U.S. application.

*Primary Examiner* — Craig J Price

(74) *Attorney, Agent, or Firm* — Kolitch Romano LLP

(57) ABSTRACT

An inflation system for tubeless bicycle tires may include a valve, a sealant canister, a pump head, and/or a valve core adapter. The valve, sealant canister, and pump head may collectively facilitate sealant injection into a tire by a user. The valve has an external valve seat, and includes a valve body, a valve stem extending through the length of the valve body, and a retaining mechanism for the valve stem disposed interior to the valve body. The valve stem is configured to move relative to the valve body, such that a resilient seating surface disposed at a proximal end of the valve stem is displaced relative to a valve seat formed by an exterior surface of a proximal end of the valve body.

18 Claims, 24 Drawing Sheets

(51) Int. Cl.
*B60C 5/16* (2006.01)
*B60C 23/04* (2006.01)

(52) U.S. Cl.
CPC ..... *B60C 23/0496* (2013.01); *Y10T 137/0491* (2015.04); *Y10T 137/374* (2015.04)

(58) Field of Classification Search
CPC .. F16K 15/205; F16K 31/528; F16K 31/5286; Y10T 137/3584–3802; Y10T 137/374; Y10T 137/3755; Y10T 137/3771; Y10T 137/0491
USPC ............. 137/223–230, 234.5; 251/160–166, 251/180–185, 192, 304–317.01; 152/415–431
See application file for complete search history.

(56) References Cited

U.S. PATENT DOCUMENTS

| | | | | |
|---|---|---|---|---|
| 1,353,415 | A * | 9/1920 | Newsom | F16K 15/20 137/232 |
| 1,356,457 | A * | 10/1920 | Mapel | B60C 23/0496 137/224 |
| 1,671,123 | A * | 5/1928 | Payne | B60C 23/0496 137/234 |
| 2,825,527 | A * | 3/1958 | Wendell | F16K 5/0442 251/96 |
| 5,398,744 | A | 3/1995 | Street | |
| 6,102,064 | A * | 8/2000 | Robinson | B60C 29/06 137/232 |
| 6,454,892 | B1 | 9/2002 | Gerresheim | |
| 8,646,477 | B2 * | 2/2014 | Wen | B60C 29/005 137/223 |
| 10,562,361 | B2 * | 2/2020 | Chang | B60C 29/002 |
| 10,563,782 | B2 * | 2/2020 | Moore | B60C 29/002 |
| 2005/0028865 | A1 * | 2/2005 | Nikolayev | F16L 37/23 137/223 |
| 2011/0011217 | A1 | 1/2011 | Kojima | |
| 2011/0277877 | A1 | 11/2011 | Stehle | |
| 2015/0298516 | A1 | 10/2015 | Purisch et al. | |
| 2015/0343723 | A1 | 12/2015 | Takahara | |
| 2016/0347011 | A1 | 12/2016 | Wang | |
| 2018/0333927 | A1 | 11/2018 | Spindler | |
| 2019/0210416 | A1 * | 7/2019 | Teixeira | B60B 21/12 |

FOREIGN PATENT DOCUMENTS

| | | |
|---|---|---|
| DE | 10337687 A1 | 3/2005 |
| DE | 202008007517 U1 | 9/2008 |
| DE | 102015203972 A1 | 9/2016 |
| EP | 0753420 B1 | 10/2001 |
| EP | 1419876 A2 | 5/2004 |
| EP | 2261011 A1 | 12/2010 |
| EP | 2217431 B1 | 12/2013 |
| EP | 2618993 B1 | 12/2014 |
| JP | 5384317 B2 | 1/2014 |
| KR | 20030081782 A | 10/2003 |
| WO | 2018210836 A1 | 11/2018 |
| WO | 2019023758 A1 | 2/2019 |

\* cited by examiner

INFLATION SYSTEM FOR TUBELESS TIRES

CROSS-REFERENCES

This application claims the benefit under 35 U.S.C. § 119(e) of the priority of U.S. Provisional Patent Application Ser. No. 62/835,206, filed Apr. 17, 2019, and U.S. Provisional Patent Application Ser. No. 62/914,041, filed Oct. 11, 2019, the entireties of which are hereby incorporated by reference for all purposes.

FIELD

This disclosure relates to systems and methods for inflating tubeless tires. More specifically, the disclosed embodiments relate to valves, sealant delivery canisters, pump heads, and valve core adapters for inflating tubeless bicycles tires.

INTRODUCTION

Tubeless bicycle tires, which are pneumatic tires that do not require an inner tube, are increasingly popular in road and mountain bikes, as they provide increased traction, the ability to instantly seal out tire punctures, decreased weight, and increased speed when compared with conventional bicycle tires. However, tubeless tires are more difficult to install than conventional bicycle tires, and require more maintenance. Tubeless bicycle tires must be initially seated in a bicycle rim, a process which requires constant air pressure. Additionally, sealant must be present in the air mixture filling the tires to maintain a constant seal between the tire and the rim.

Many tubeless tires use either Presta valves or Schrader valves to facilitate inflating the tire. However, these valves typically provide insufficient air flow for initial seating of the tire to the rim, do not allow for easy addition of sealant, and are often clogged by sealant due to their small diameter. Some existing tubeless tire valves allow for the addition of sealant by providing a valve core removal tool. However, these valves require complete deflation of the tire for sealant addition and are built within a Presta or Schrader valve body, resulting in the same air flow and clogging problems as typical Presta or Schrader valves.

High flow hand pumps and compressed air canisters are typically used to seat a tubeless tire to a bicycle rim. High flow pumps include a large internal pump piston, providing higher flow than a standard hand pump. Compressed air canisters hold a large volume of compressed air, providing a constant stream of high flow air. However, Presta and Schrader valves restrict air flow due to their small internal diameters.

Sealant is often added to tubeless tires using a syringe. Syringes typically used in the bicycle industry have a tip outer diameter (OD) small enough to fit within the inner diameter (ID) of a valve body. Syringes can be used to inject sealant into a deflated tire with the valve core removed. However, syringes are unable to inject sealant into a tire under pressure, with the valve intact. Some devices are specifically designed to add sealant to a deflating or deflated tubeless tire. These devices generally include a chamber designed to hold sealant, a valve connecting the device to an air compressor, and a hose including a pump head that connects to the valve of the tire. Pressurizing the device chamber forces sealant through the tire valve and into the tire. These devices have several disadvantages, including: requiring a user to remove the valve core for the injection of thicker sealants, a large size, and requiring the valve core be reinstalled while the tire is depressurizing. The process of removing and reinstalling the valve core is difficult for the user, and can result in loss or damage to the valve core. These devices also do not allow for the addition of sealant to a pressurized tire.

Typical bicycle pump heads are configured to clamp or push onto a tire valve. Clamp-on pump heads have an expandable collet on the nose of the pump head. Opening the collet requires the user to pull back on a collar while pushing on the rear of the pump head body, or in some cases requires the use of a lever. The seal in clamp-on pump heads expands and retracts, which wears out the collet. Clamp-on pump heads also require more hand strength to operate, resulting in increased stress on the bicycle valve and bicycle rim. Press-on pump heads clamp and seal to the bicycle valve using an O-ring. O-rings often do not provide a large enough clamping force for higher air pressures. Press-on pump heads can then often be dislodged during tire inflation. The O-ring also wears out due to sliding over threads on the outside surface of the bicycle valve.

Quick connect fittings are standard in many industrial applications, such as in pneumatics and hydraulics. These fittings allow for quick, hand-operated connections. Existing quick connect fittings are designed to shut off the air passage when not connected. This air passage shut off can lead to hand pumps being stored in a pressurized state. Additionally, the plunging element in a quick connect mechanism is not designed to retract far enough into the quick connect fitting to attach to a valve including threaded connectors (e.g., for standard pump heads) and a quick connect groove.

SUMMARY

The present disclosure provides systems, apparatuses, and methods relating to inflation systems for tubeless tires.

In some embodiments, an inflation valve for a tubeless tire may include: a valve body having a proximal end and an open distal end, and defining an internal cavity; and a valve stem extending continuously through the internal cavity, such that a threaded end of the valve stem protrudes beyond the open distal end of the valve body; wherein the proximal end of the valve body comprises a valve seat having an outer diameter larger than an inner diameter of the valve body, and a corresponding proximal end of the valve stem includes a resilient seating surface; and wherein the valve is configured to be transitionable between: (a) a closed position, in which the resilient seating surface mates with the valve seat and seals the proximal end of the valve body, and the threaded end of the valve stem extends beyond the distal end of the valve body by a first distance, and (b) an open position, in which the resilient seating surface is spaced from the valve seat, and the threaded end of the valve stem extends beyond the distal end of the valve body by a second distance less than the first distance.

In some embodiments, an inflation system for a tubeless tire may include: an inflation valve including: a valve body having an open proximal end and an open distal end, wherein a valve seat is formed at a periphery of the proximal end; a valve stem extending coaxially through an internal cavity of the valve body, the valve stem including a threaded distal end protruding beyond the open distal end of the valve body; and a valve plug extending from a proximal end of the valve stem beyond the proximal end of the valve body, the valve plug including a resilient seating surface configured to mate with the valve seat; wherein the valve stem is retained in the valve body by a transverse pin coupled to the valve body and passing through a slot formed in the valve stem.

In some embodiments, a method of operation for a tire inflation valve may include: partially unscrewing a valve cap installed on an inflation valve of a tubeless tire, the inflation valve including a valve body having an open proximal end and an open distal end, wherein a valve seat is formed at a periphery of the proximal end, a valve stem extending coaxially through an internal cavity of the valve body, the valve stem including a threaded distal end coupled to the valve cap, and a valve plug extending from a proximal end of the valve stem beyond the proximal end of the valve body, the valve plug including a resilient seating surface configured to mate with the valve seat, wherein the valve stem is retained in the valve body by a transverse pin coupled to the valve body and passing through a slot formed in the valve stem; applying a generally axial force on the valve cap to cause the valve stem to travel toward the proximal end of the valve, such that the valve plug is unseated and air escapes through a resulting annular opening; releasing the generally axial force from the valve cap, such that air pressure within the tire causes the valve to reseat; and locking the inflation valve by screwing the valve cap onto the valve stem until a portion of the valve cap abuts the distal end of the valve body.

Features, functions, and advantages may be achieved independently in various embodiments of the present disclosure, or may be combined in yet other embodiments, further details of which can be seen with reference to the following description and drawings.

DETAILED DESCRIPTION

Figure 1:
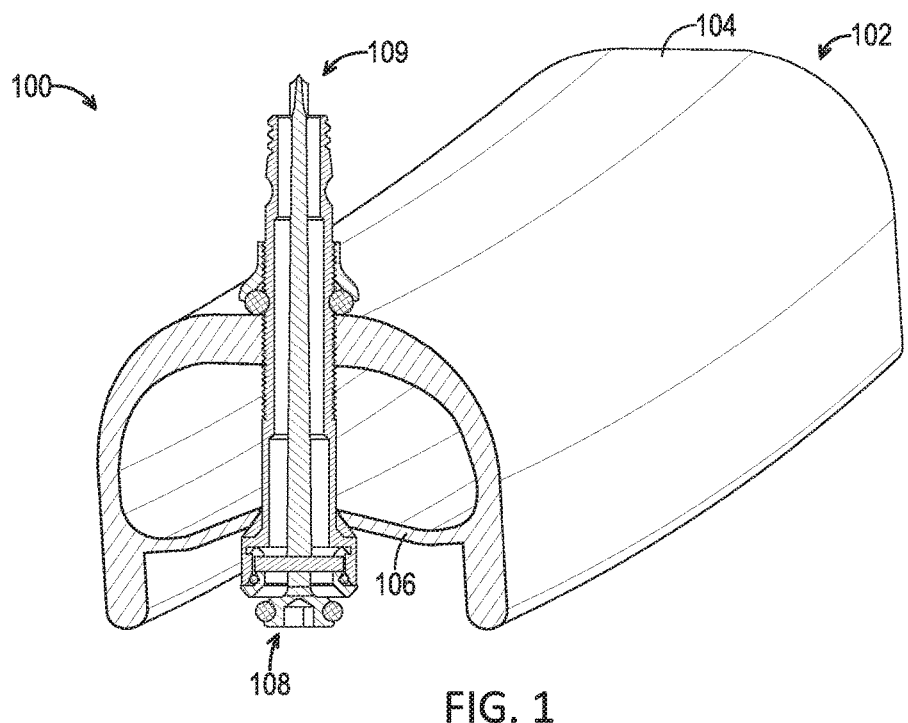
FIG. 1 is a cross-sectional view of an illustrative bicycle valve of the present disclosure, shown mounted in a bicycle rim in accordance with aspects of the present disclosure.

Various aspects and examples of an inflation system for tubeless tires, as well as related methods, are described below and illustrated in the associated drawings. Unless otherwise specified, an inflation system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through I, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, an inflation system in accordance with the present teachings may include a valve, a sealant canister, a pump head, and/or a valve core adapter. These components may be used, either individually or in combination, to inflate a tubeless bicycle tire or other tubeless tire.

Valves of the present disclosure have an external valve seat, and include a valve body, a valve stem extending through the length of the valve body, and a retaining mechanism for the valve stem disposed interior to the valve body. The valve body defines an interior cavity through which the valve stem moves axially during valve operation. The valve stem includes a threaded end disposed at a distal end, and a resilient seating surface (e.g., an O-ring) disposed at a proximal end. The valve stem is configured to move relative to the valve body, such that the resilient seating surface is displaced relative to a valve seat formed by an exterior surface of the proximal end of the valve body. Accordingly, in some examples, an outer diameter (OD) of the valve seat is larger than the inner diameter (ID) of the valve body, facilitating increased air flow through the valve, especially as compared with valves having internal valve seats. In some examples, an ID of the valve seat is the same size as the ID of the valve body.

The valve is transitionable between a closed position, in which the resilient seating surface mates with the valve seat, sealing the proximal end of the body, and an open position, in which the resilient seating surface is spaced apart from the valve seat, allowing air to flow through the valve. The seating surface at the end of the valve stem is configured to move toward and away from the proximal end of the valve body, and during use is normally biased against the valve seat by air pressure in the tire.

In some examples, the valve stem is longer than the valve body, such that the threaded end protrudes from the distal end of the valve body. The threaded end may be pressed inward (toward the proximal end) by a user, unseating and opening the valve. As mentioned above, this action is opposed by a spring force exerted by air pressure within the tubeless tire. The valve is maintained in the closed position unless a greater force is exerted on the valve stem, thereby moving the resilient seating surface away from the valve seat.

In some examples, the valve includes a valve cap configured to cover the threaded distal end of the valve stem. The valve cap includes internal threads configured to mate with the threaded end of the valve stem. In some examples, the valve cap is configured to "lock" the valve stem into a closed position. For example, the valve cap may prevent axial displacement of the valve stem when the valve cap is fully threaded onto the threaded end. In some examples, the valve stem is axially displaceable when the valve cap is partially threaded onto the threaded end. For example, a user may press the valve cap toward the proximal end of the valve in this condition, releasing air from the valve without fully removing the cap. The valve cap may include an internal groove or channel configured to provide a path for the release of air from the valve while the cap is threaded onto the valve stem.

In some examples, the threaded end of the valve stem includes trimmed or partial threads, improving air flow. The threads may be trimmed so that the threaded end has two opposing flat surfaces, with threaded portions extending between the flat surfaces. In some examples, the threaded end of the valve stem includes grooves, slots, or channels disposed along the flat surfaces, which may further increase airflow.

In some examples, the valve stem is held in the valve body by a retaining mechanism disposed within the interior cavity. For example, the valve stem may include a slot, through which a fixed pin may extend, such that the valve stem is prevented from rotating, limited to a selected range of motion, and secured from exiting the valve bod. The fixed length of the slot may have a fixed length, restricts axial movement of the valve stem. In some examples, the pin is coupled to the valve body by a threaded insert disposed at the proximal end of the valve body. For example, the threaded insert may include a pair of opposing holes or apertures configured to hold the pin in place. In some examples, the threaded insert also includes a portion external to the valve body on which the valve seat is formed.

In some examples, the exterior surface of the valve body includes a circumferential groove near the distal end, facilitating connection with a quick connect pump head. In some examples, the exterior surface of the valve body includes threads, facilitating connection with a pump head for a standard threaded bicycle pump. In some examples, the exterior surface of the valve body includes threads disposed near the distal end of the valve body and includes a circumferential groove disposed between the threads and the proximal end of the valve body, so that the valve is compatible with both a quick connect pump head and a standard pump head. In some examples, the threads are flattened to improve sliding of the cap along the valve body or of a quick connect attachment along the valve body.

In general, a sealant canister in accordance with the present disclosure includes a cylindrical canister body defining a sealant cavity, a valve-to-canister interface disposed on a first end of the canister body, and a canister valve disposed on a second end of the canister body. The valve-to-canister interface is configured to be coupled to a tubeless tire valve, as described above. The canister valve is configured to be coupled to a pressurized air source (e.g., a compressed air pump, a bicycle pump, etc.). The sealant canister introduces sealant to a pressurized or deflated tire.

In general, a pump head in accordance with the present disclosure includes a pump head body coupled to a sliding collar. The collar is configured to clamp ball bearings into a circumferential or quick connect groove included in a bicycle valve. Sliding the collar toward the valve clamps the pump head onto the valve, and sliding the collar toward the pump head releases the valve.

In general, valve core adapters in accordance with the present disclosure include an adapter body, a valve stem extending through the adapter body, a cap configured to cover a distal end of the valve core adapter, and a resilient seating surface. Valve core adapters may enable a bicycle user to replace a core of a bike valve without inserting a new core into the valve body. Valve core adapters may also enable a user to use a quick connect pump head similar to pump heads according to the present disclosure. Valve cores in accordance with the present disclosure may function similarly to valves described above, with axial movement of the valve stem determining a distance between the resilient seating surface and a valve seat disposed at a proximal end of the valve core adapter.

In general, inflation systems of the present disclosure may include any of the above components, either alone or in combination. An illustrative combination includes a valve combined with a sealant canister and a pump head to introduce sealant to a tubeless bicycle tire. Another illustrative combination includes a valve combined with a pump head to introduce air into a tubeless bicycle tire. Another illustrative combination includes a valve core adapter combined with a sealant tube and a pump head to introduce sealant to a tubeless tire originally including a different bicycle valve.

A method of releasing air from a tire valve may include: unscrewing a valve cap, optionally backthreading the valve cap, pressing the valve cap toward a proximal end of the valve, and releasing air from the valve.

A method of installation for a tubeless bicycle tire may include: mounting the tire to a rim, inflating the tire to a desired pressure, coupling a sealant canister to a bicycle valve installed in the rim, coupling a bicycle pump to the sealant canister, and adding sealant to the tire.

A method of adding sealant to an installed tubeless bicycle tire may include: optionally releasing a volume of air from the tire, coupling a sealant canister to a bicycle valve, coupling a bicycle pump to the sealant canister, and adding sealant to the tire.

A method of disassembling a bicycle valve (e.g., for cleaning purposes) may include: placing a key (e.g., a hex or Allen key) in a polygonal socket disposed on the proximal end of the valve, turning the Allen key counterclockwise, and removing internal valve components. As described above, for example, turning the insert at the proximal end of the valve body would eventually unthread and remove the insert, along with the pin and stem coupled thereto.

EXAMPLES, COMPONENTS, AND ALTERNATIVES

The following sections describe selected aspects of illustrative inflation systems for tubeless tires, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Valve

As shown in FIGS. 1-11, this section describes an illustrative bicycle valve 100. Bicycle valve 100 is an example of the valves for tubeless bicycle tires, described above. Valve 100 is configured to be installed in a bicycle rim 102, as illustrated in FIG. 1. Valve 100 regulates a flow of air into and out of a tubeless tire, which may be installed onto rim 102.

Figure 2:
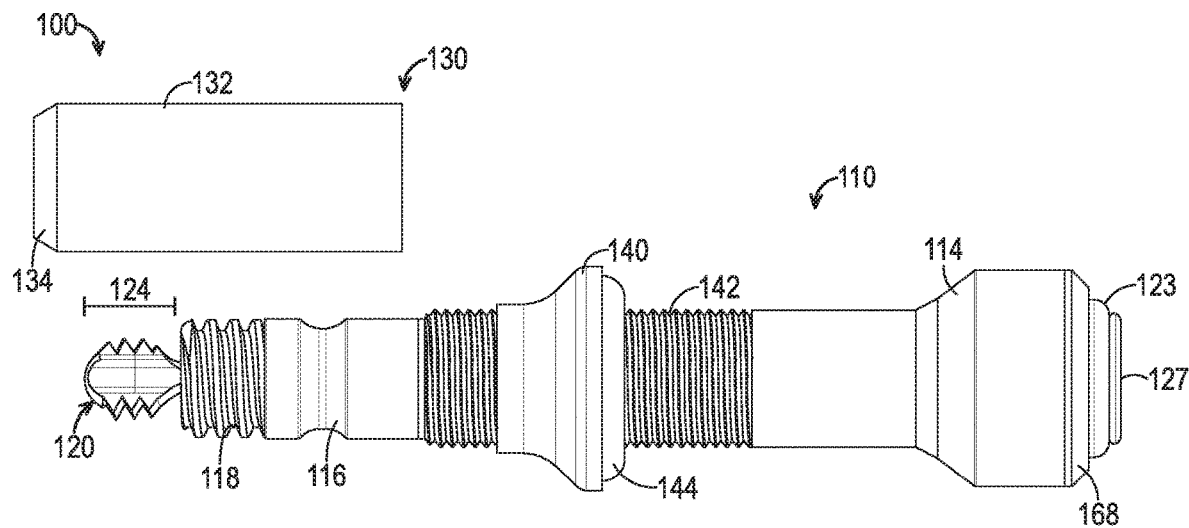
FIG. 2 is a side view of the bicycle valve of FIG. 1, shown in a closed configuration.
Figure 3:
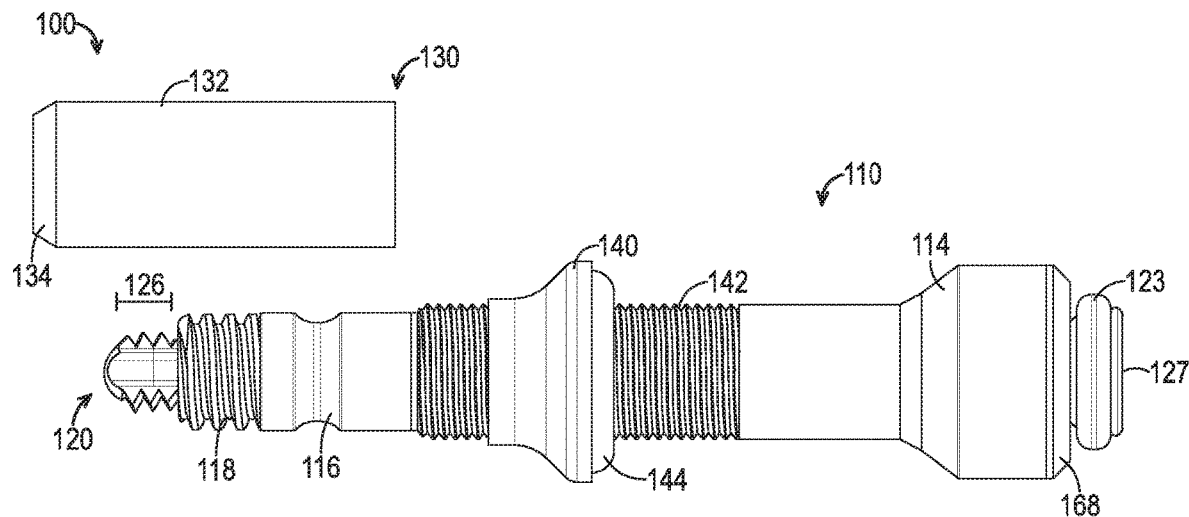
FIG. 3 is a side view of the bicycle valve of FIG. 1, shown in an open configuration.

Valve 100 is transitionable between a closed position (see FIG. 2) and an open position (see FIG. 3). Valve 100 includes a valve body 110 defining an internal cavity 112 and a valve stem 120 (AKA valve rod), which extends continuously through and is movable within the valve cavity. As shown in FIG. 2, when valve 100 is in the closed position, a resilient seating surface 122 disposed at a proximal end 172 of the valve stem mates with a valve seat 168 disposed at a proximal end 108 of the valve body, sealing the proximal end of the valve. When the valve is in the closed position, valve stem 120 extends beyond the distal end of the valve body by a first distance 124. As depicted in FIG. 3, when valve 100 is in the open position, seating surface 122 is spaced apart from valve seat 168 (in a direction generally toward the tire), enabling a flow of air through the valve.

As the OD of valve seat 168 is larger than the ID of valve body 110, air flow through the valve body is not restricted by the valve seat. A flow of air through the valve and around the valve seat is generally annular, with an outer diameter of the annulus corresponding to an outer diameter of the valve seat. In some examples, a flow of air out of the valve is laminar. When the valve is in the open position, valve stem 120 extends beyond a distal end 109 of the valve body by a second distance 126. First distance 124 is greater than second distance 126, as the valve stem moves toward proximal end 108 of the valve when the valve is opening.

Valve 100 includes a removable cap 130, which covers the distal end of the valve stem. Air may be released from the valve while the cap is coupled to the valve, and the cap is removable to permit inflation through the valve. The valve also includes a mounting nut 140 for securing the valve to the rim, which is threaded onto mounting threads 142 disposed on an exterior surface of the valve body. A distal end of nut 140 may be designed to be flush with an outer diameter of cap 130. Nut 140 includes a sealing ring 144 (e.g., an O-ring) disposed within a chamfer 146 of the nut. Sealing ring 144 may comprise any suitable resilient material, such as rubber, resilient polymers, and/or the like. Sealing ring 144 is configured to abut an exterior surface 104 of rim 102.

To complete the clamping mechanism, valve body 110 includes a tapered flange 114 disposed adjacent the proximal end, which is configured to contact an inner wall or surface 106 of rim 102. Mounting nut 140 may be tightened or loosened as needed to secure the valve to rim 102. In some examples, the mounting nut is included as a component of a bicycle rim. In some examples, mounting nut 140 forms one component of a two-component valve body. Mounting nut 140 may comprise any suitably durable material, such as aluminum, copper, brass, steel, titanium, plastic, composite, and/or the like.

In some examples, valve 100 includes a circumferential groove 116 (AKA a quick connect groove) disposed on an exterior surface of valve body 110. Quick connect groove 116 may be configured to mate with a quick connect fitting, such as one in a quick-connect bicycle pump head. In some examples, valve 100 includes threads 118 disposed on an exterior surface of valve body 100. Threads 118 are configured to mate with threads of a standard bicycle pump head. In some examples, valve 100 includes both circumferential groove 116 and threads 118, such that valve 100 is selectively operable with either a quick connect pump or a standard pump, as desired. In some examples, threads 118 are flattened, turned down, or otherwise smoothed to facilitate sliding of cap 130 and any quick connect fittings along the exterior surface of body 110. In some examples, valve 100 includes either male or female components of a push and twist connection system, or any other suitable connection system for connecting a bicycle pump to a valve.

Valve body 110 has an interior profile configured to facilitate optimal air flow while retaining structural integrity. Walls of valve body 110 are thicker in quick connect regions and regions with external threads, and thinner or flared in other regions to allow for increased air flow. In some examples, walls of valve body 100 are flared to allow for interior threads (e.g., interior threads to hold threaded insert 164). In some examples, valve body 110 is substantially cylindrical. In some examples, valve body 110 includes external flats, which may provide a place for a user to grip (e.g., using a wrench) when tightening threaded components.

The valve may have any suitable diameter configured to allow adequate air flow without compromising structural integrity of an associated rim. In some examples, the valve has a diameter similar to that of a Presta valve (approximately 7 mm), allowing the valve to be used with rims designed to receive Presta valves. In some examples, the valve has a diameter similar to that of a Schrader valve (approximately 8.5 mm-9 mm), allowing the valve to be used with rims deigned to receive Schrader valves. The valve may comprise any suitably durable material, such as brass, copper, steel, titanium, plastic, composite, and/or the like.

Figure 4:
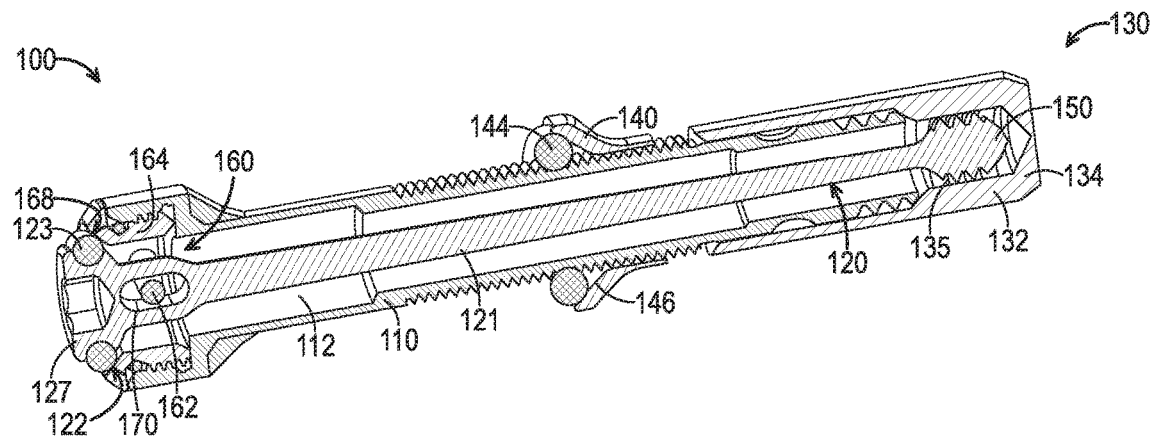
FIG. 4 is a sectional view of the bicycle valve of FIG. 1, shown in a closed configuration.
Figure 5:
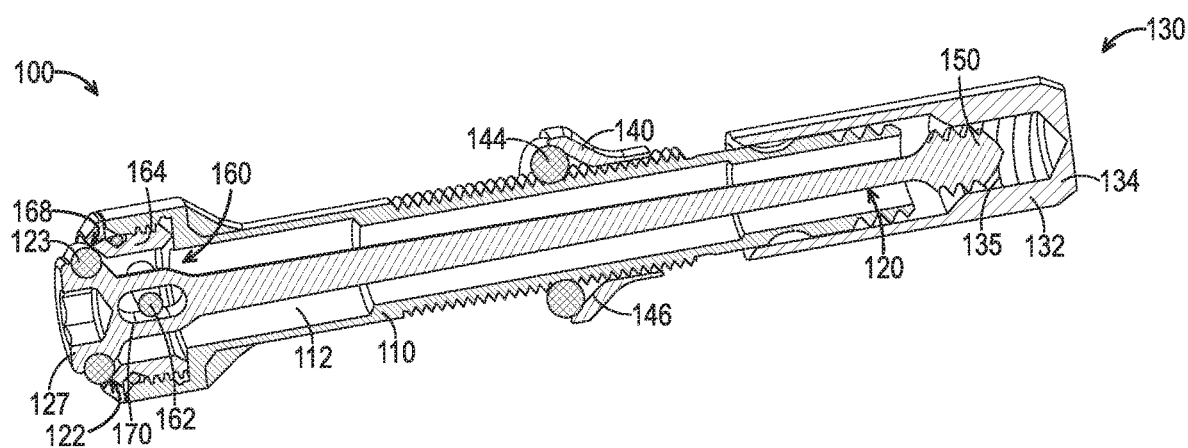
FIG. 5 is a sectional view of the bicycle valve of FIG. 1, shown with the cap partially unscrewed and the valve fully closed.
Figure 6:
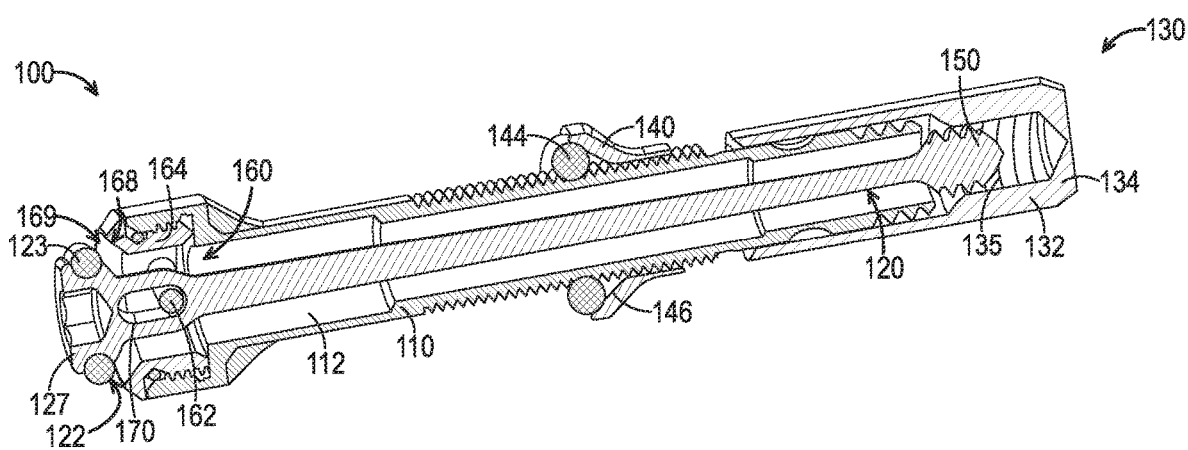
FIG. 6 is a sectional view of the bicycle valve of FIG. 1, shown in an open configuration.

Valve 100 is configured such that normal operation of the wheel (e.g., riding the host bicycle) and selected deflation of the tire via the valve are both facilitated while cap 130 is installed and covering the distal end of the valve stem (see FIGS. 4-6). Cap 130 includes internal threads 135 which are configured to mate with a threaded end 150 of valve stem 120.

As depicted in FIG. 4, cap 130 may be placed into a first position configured to "lock" the valve closed (i.e., with the valve fully seated). In this position, cap 130 is screwed fully onto threads 152 of threaded end 150, such that the valve stem may not be pressed or otherwise moved toward the proximal end of the valve. In this position, an interior surface of the cap abuts an end surface of the valve body, preventing both the valve stem and the cap from moving toward the opened position. In this position, resilient seating surface 122 is secured against valve seat 168, and no air flows through the valve.

As depicted in FIG. 5, cap 130 may be placed into a second position by partially unscrewing cap 130 from the threaded end of the valve stem, such that the cap remains attached to threaded end 150, but the cap no longer abuts the distal end of the valve body. In this position, resilient seating surface 122 remains seated on valve seat 168, but valve stem 120 is free to move along its long axis. If the valve is installed in a rim having a tubeless tire, the valve remains seated due to the force exerted by air pressure within the tire.

FIG. 6 depicts the valve in an open position. In this position, cap 130 has been pressed toward the proximal end of the valve, moving valve stem 120 by a corresponding distance due to the mating connection between the cap and stem. Resilient seating surface 122 is unseated and moved away from valve seat 168, allowing air to exit the tire through the resulting annular opening 169. Depending on how far the cap has been unthreaded, travel of the valve stem is limited by a pin 162 (i.e., by the length of a slot 170 see description below), and/or by the cap coming into contact with the distal end of the valve.

Figure 7:
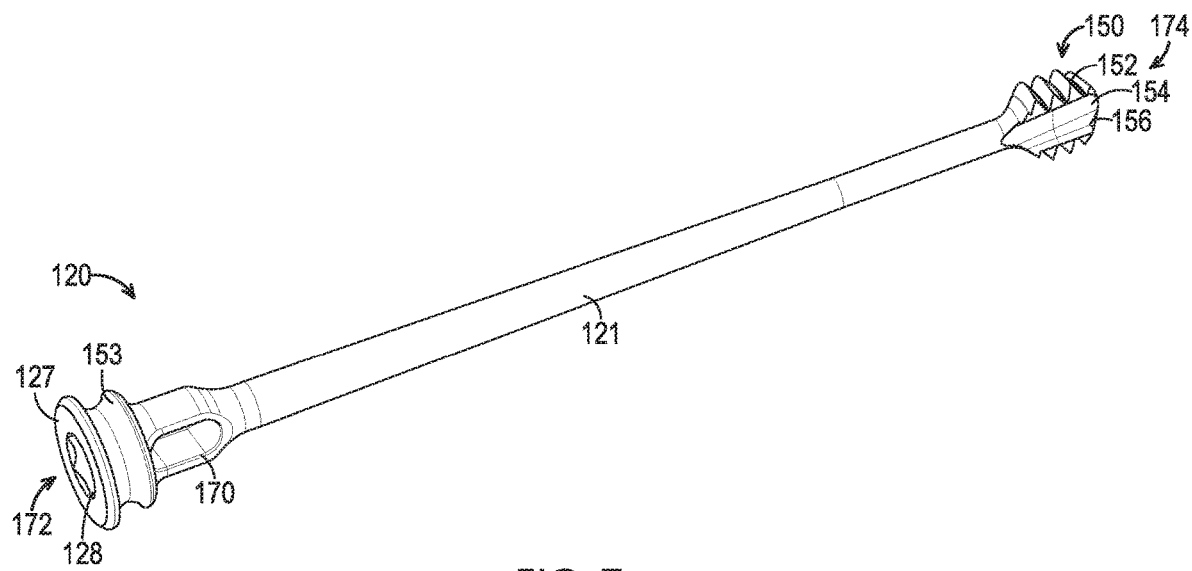
FIG. 7 is an isometric view of a valve stem of the bicycle valve of FIG. 1.

Valve stem 120 (AKA valve rod) is depicted in FIG. 7. Valve stem 120 includes an elongate valve shaft 121 including threaded end 150 at a distal end and a circumferential channel 153 formed in a valve plug 127 at a proximal end. Valve stem 120 may comprise any suitably rigid and durable material, such as brass, aluminum, copper, steel, titanium, plastic, composite, and/or the like.

Threaded end 150 includes an enlarged portion of the stem having threads 152 configured to mate with internal threads of cap 130. Threads 152 may be relatively coarse, for increased durability. However, coarse threads result in a larger stem diameter than fine threads, which may impede air flow through the valve. Threaded end 150 may be trimmed to remove portions of threads 152, so that threaded regions are disposed between flat regions 154. In some examples, threads 152 are trimmed bi-laterally, creating two parallel flat regions. In some examples, 66% of threaded end 150 comprises flat regions. In some examples, 25%, 33%, 50% or 75% of threaded end 150 comprises flat regions. Flat regions 154 may extend a length of threaded end 150. In some examples, threaded end 150 includes grooves, recesses, or channels 156 formed on surfaces of flat regions 154. Grooves 156 may be configured to further reduce a cross-sectional profile of threaded end 150, increasing air flow.

Channel 153 is configured to receive a resilient seating member 123 forming seating surface 122. In some examples, resilient seating member 123 comprises an O-ring. Resilient seating member 123 may comprise rubber, resilient polymer, and/or any suitable resilient material. Valve plug 127 and resilient seating member 123 collectively block air flow through valve body 110 when the valve is in the closed position. Stem 120 further includes a polygonal socket 128 disposed on a proximal surface of valve plug 127. In some examples, the polygonal socket may be hexagonal and configured to receive an Allen key. The polygonal socket may allow for removal of the valve seat and stem, e.g., for valve cleaning.

Valve stem 120 includes a slot 170 formed therethrough, and in this example disposed adjacent valve plug 127, although slot 170 may be disposed at any suitable location along the length of the stem. Slot 170 is configured to receive, slide over, and be limited by pin 162 of retaining mechanism 160, described below. Valve stem 120 may include additional features to improve retention of the valve stem within the valve body or to prevent rotation, such as wings, fins, extrusions, and/or the like.

Some further examples of valve stem 120 are listed below. In some examples, valve stem 120 is coupled to cap 130 and has a threaded connection with valve plug 127. In some examples, valve stem 120 includes multiple discrete components. In some examples, valve stem 120 is hollow and has air ports to increase air flow. In some examples, threads 154 of threaded end 150 are fine, and threaded end 150 is cylindrical without flat regions. In some examples, valve stem 120 is replaced by a sliding ball and/or a piston. In some examples, the ball or piston protrude from the valve body, allowing a user to discharge air from the valve by pressing on the ball or piston.

In examples where threaded end 150 of stem 120 includes parallel flat regions, the valve stem may be manufactured by stamping the thread profile from a thin sheet of metal. This stamping process may produce similar flow characteristics to a machined valve stem, while being significantly less expensive. Stamping the thread profile may also include producing retaining slot 170. The stamped rod can then be attached (e.g., by bonding, welding, brazing, etc.) to valve plug 127.

Figure 8:
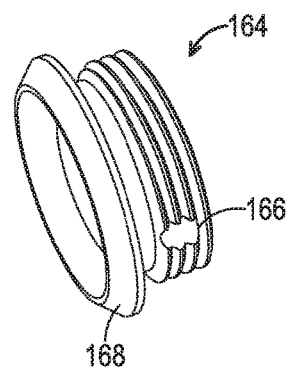
FIG. 8 is an isometric view of a retaining collar of the bicycle valve of FIG. 1.
Figure 9:
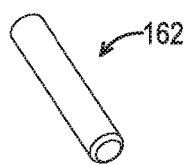
FIG. 9 is an isometric view of a pin of the bicycle valve of FIG. 1.

Valve stem 120 is retained and constrained within the valve body by retaining mechanism 160 disposed in internal cavity 112. Retaining mechanism 160 includes pin 162, threaded insert 164, and slot 170 of valve stem 120, which are illustrated in FIGS. 7-9.

Pin 162 (see FIG. 9) is configured to pass through slot 170 of valve stem 120, preventing the valve stem from rotating and limiting axial travel. Pin 162 is fixed with respect to valve body 110. Pin 162 is coupled to the valve body by a threaded insert 164 (see FIG. 8) removably coupled to the proximal end of the valve. Pin 162 extends between a pair of opposing apertures 166 configured to hold the pin. Exterior threads of threaded insert 164 mate with interior threads disposed on an interior surface of valve body 110. Threaded insert 164 includes valve seat 168, which is disposed exterior to valve body 110 at the proximal end. Valve seat 168 has a larger OD than an ID of valve body 110, facilitating increased air flow through the valve. Insert 164 may include a channel configured to hold an O-ring or other resilient sealing member.

Threaded insert 164 and pin 162 may comprise any suitable material, such as brass, aluminum, copper, steel, titanium, plastic, composite, and/or the like. In some examples, retaining mechanism 160 can be removed (e.g., for cleaning) using the polygonal socket of stem 120. Because stem 120 is rotationally fixed to insert 164, forcing the stem to rotate will unthread insert 164 from the valve body, enabling cleaning. In some examples, pin 162 and insert 164 are formed as a single piece. In some examples, pin 162 and insert 164 are fixed with respect to the valve body. In some examples, insert 164 is glued, bonded, adhered, or otherwise fixed to the valve body.

Figure 10:
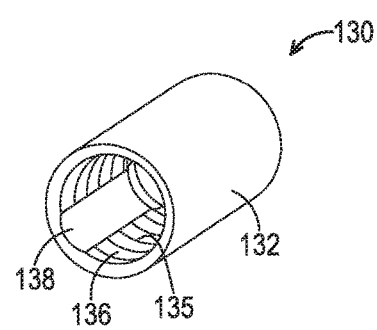
FIG. 10 is an isometric view of a valve cap of the bicycle valve of FIG. 1.

Cap 130 is illustrated in FIG. 10. Cap 130 includes a cylindrical cap body 132 and a flat cap head 134. Cap 130 includes internal threads configured to thread onto threads 152 of threaded end 150. To facilitate movement with respect to the valve body while the cap is coupled to stem 120, cap 130 includes an interior smooth surface 136 configured to slide against valve body 110. Cap 130 also includes a channel 138 disposed in a wall, the channel configured to facilitate the release of air from the valve while the cap is coupled to the stem. As cap 130 may be tightened onto valve body 110, preventing axial movement of valve stem 120, cap 130 functions as sealing nuts included in Presta valves.

Cap 130 may comprise any suitable material, such as aluminum, copper, brass, steel, titanium, plastic, composite, and/or the like. In some examples, cap 130 is permanently coupled to threaded end 150, and functions to release air from the tire. In some examples, cap 130 is permanently coupled to threaded end 150 and includes slots, apertures, slits, and/or other structures which may allow airflow through the cap. In some examples, cap 130 does not cover or mate with the valve body, but has a length similar to a length of threaded end 150. In some examples, cap 130 does not thread onto the valve stem, but is configured to thread onto the valve body. In some examples, cap 130 may include external flats on cap body 132, which may aid in tightening the cap (e.g., using a wrench).

Some additional examples of valves according to the present disclosure are illustrated below in FIGS. 11-24.

Figure 11:
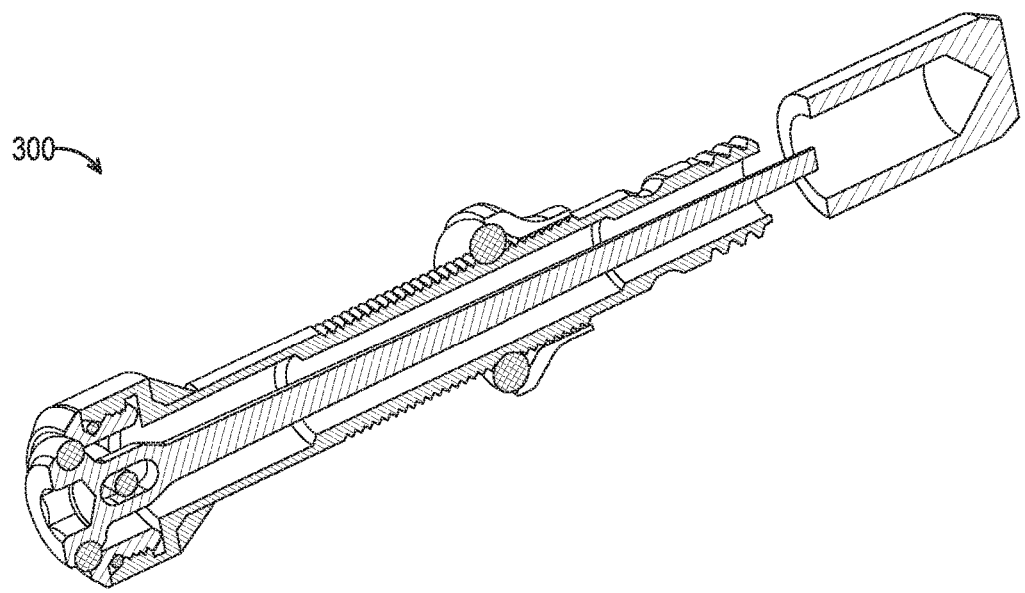
FIG. 11 is a cross-sectional view of another illustrative bicycle valve, in accordance with aspects of the present disclosure.

Valve 300, depicted in FIG. 11, is substantially similar to valve 100, but includes a valve stem 302 which does not include a threaded end. A sealing cap 304 is used to secure the valve in a closed position.

Figure 12:
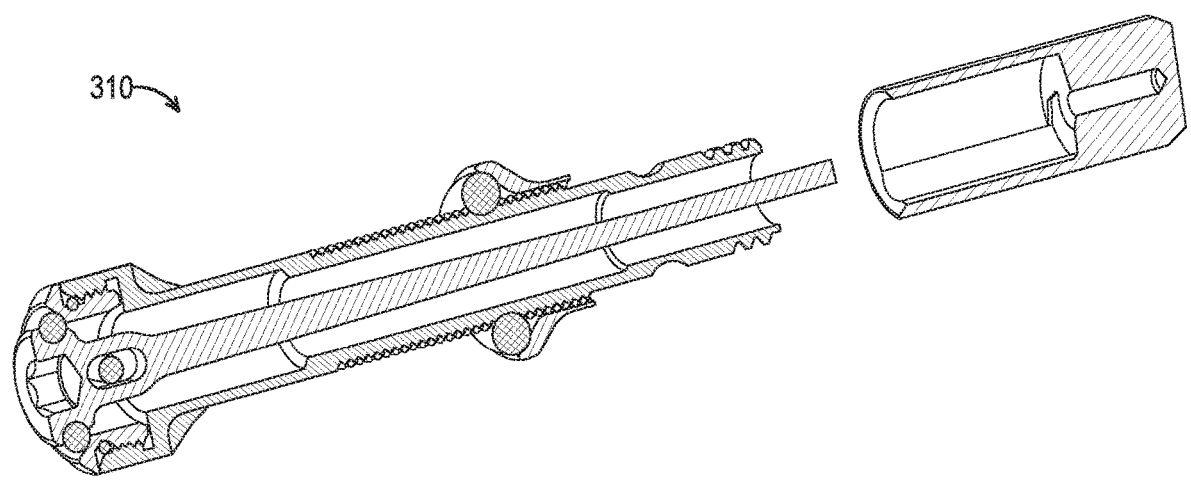
FIG. 12 is a sectional view of another illustrative bicycle valve, in accordance with aspects of the present disclosure.

Valve 310, depicted in FIG. 12, is substantially similar to valve 100, but includes a threaded end 312 having a smaller diameter thread than the threaded end of valve 100. This simplifies the shape of the stem nose, as the threaded end can have a smaller diameter. However, the end requires more turns to remove and strips more easily. The cap 314 has a smaller internal diameter so that it mates with the modified rod nose.

Figure 13:
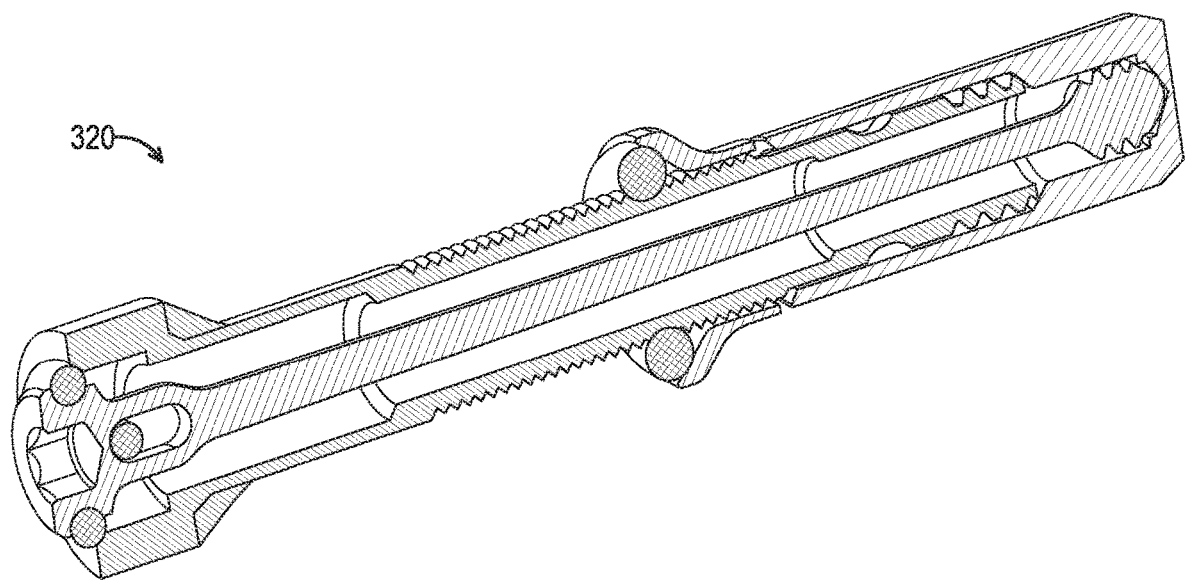
FIG. 13 is a sectional view of another illustrative bicycle valve, in accordance with aspects of the present disclosure.

Valve 320, depicted in FIG. 13, is substantially similar to valve 100, but does not include a threaded insert. Instead, the mounting pin 322 is permanently coupled to the valve body 324.

Figure 14:
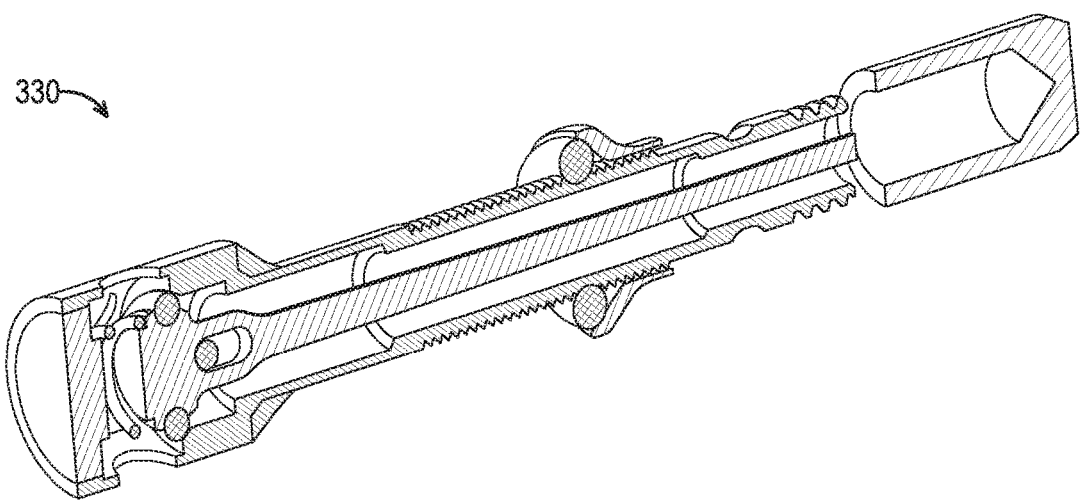
FIG. 14 is a sectional view of another illustrative bicycle valve, in accordance with aspects of the present disclosure.

Valve 330, depicted in FIG. 14, is substantially similar to valve 1100, but includes a spring 332. Valve 330 includes a valve stem 334 which does not protrude beyond the valve body, which facilitates a use of valve depressors. A sealing cap 336 is used to secure the valve in a closed position.

Figure 15:
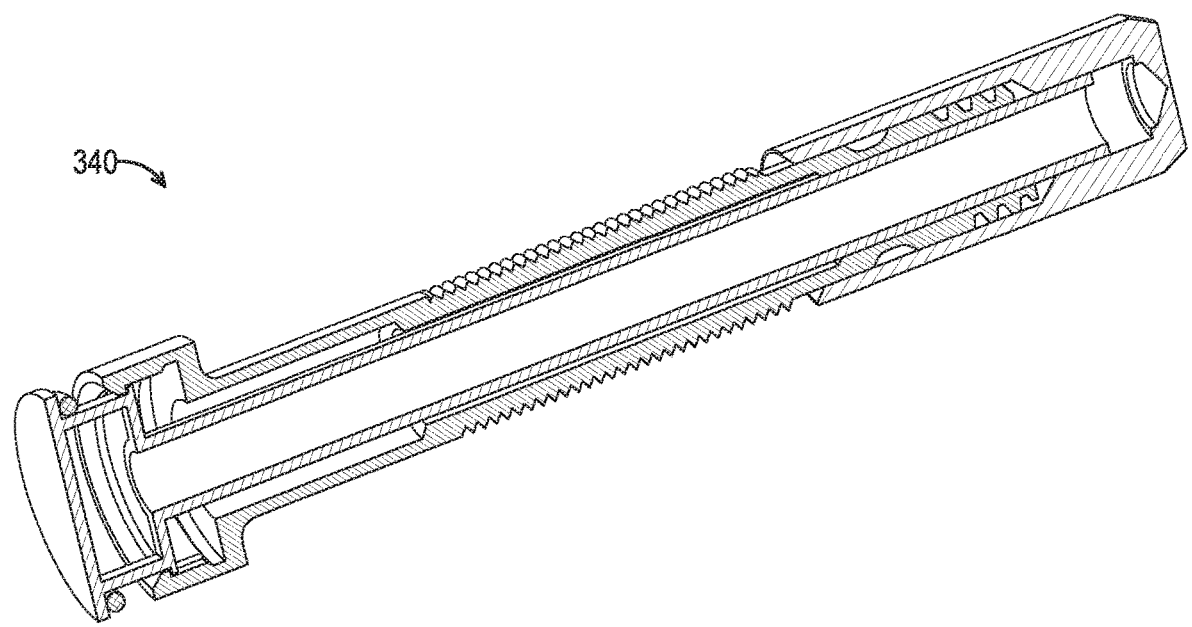
FIG. 15 is a sectional view of another illustrative bicycle valve, in accordance with aspects of the present disclosure.

Valve 340, depicted in FIG. 15, is substantially similar to valve 100, but includes a valve stem 342 including a hollow tube. Air passing through the valve travels through the tube and exits through ports 344 in the valve plug.

Figure 16:
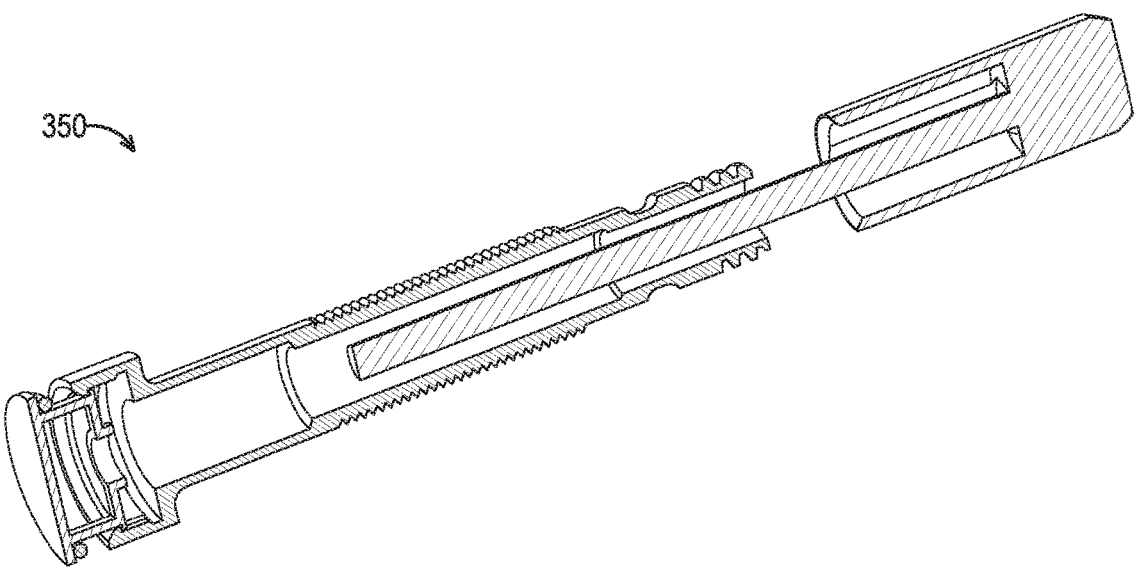
FIG. 16 is a sectional view of another illustrative bicycle valve, in accordance with aspects of the present disclosure.

Valve 350, depicted in FIG. 16, is substantially similar to valve 100, but includes a valve stem 352 which is permanently coupled to or integrated into the valve cap. The valve stem extends down through the valve body and removably couples to a combined sealing and retention member 354 disposed inside an air volume of the tire. In some examples, the valve stem has threads which mate with a threaded aperture included in the sealing element. In these examples, the threaded aperture extends through the valve plug, and conducts air when the stem is not coupled to the sealing element.

Figure 17:
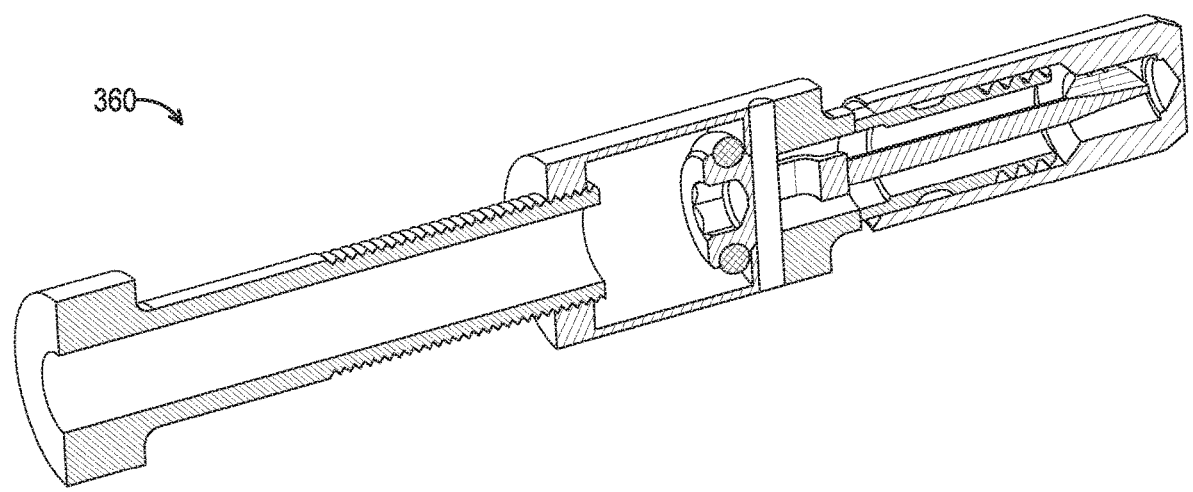
FIG. 17 is a sectional view of another illustrative bicycle valve, in accordance with aspects of the present disclosure.

Valve 360, depicted in FIG. 17, is substantially similar to valve 100, but includes two valve pieces, with a first piece 362 which fits through the rim hole and is received within the rim and a second piece 364 which does not fit through the rim hole. The second piece includes a section having a larger outer diameter which includes the retaining mechanism and is disposed outside of the bicycle rim. In some examples, the valve is configured to be disposed external to the rim, with the valve sealing mechanism (e.g., the valve seat) designed to be in line with exterior surface 104 of the rim. This may allow for easy valve removal and replacement.

Figure 18:
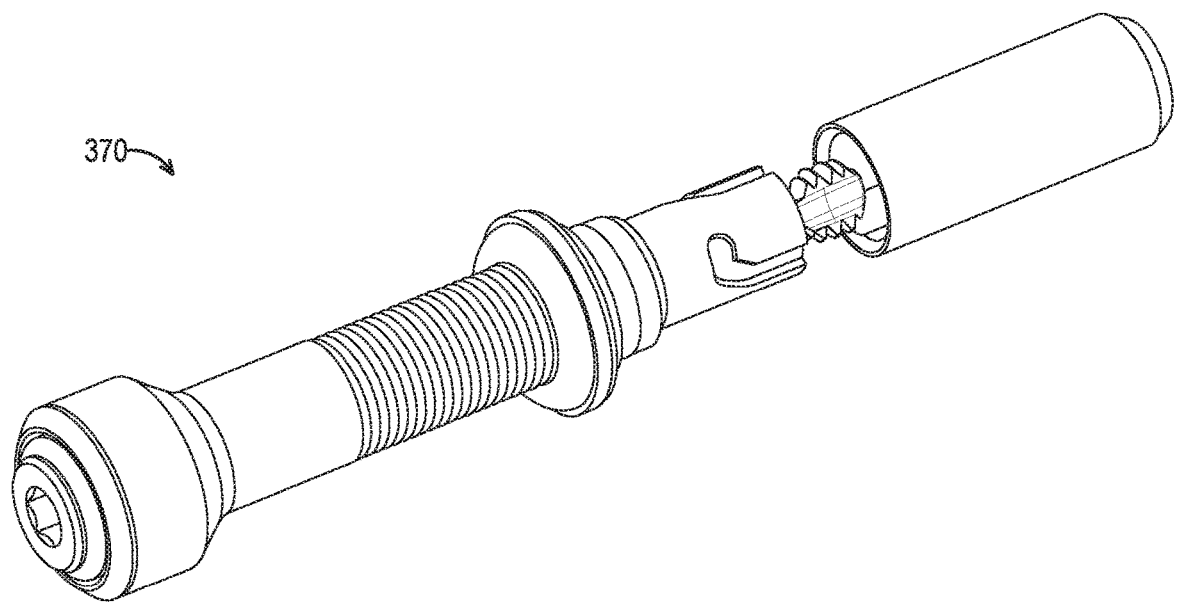
FIG. 18 is an isometric view of another illustrative bicycle valve, in accordance with aspects of the present disclosure.

Valve 370, depicted in FIG. 18, is substantially similar to valve 100, but includes hooked apertures 372 disposed near the distal end of the valve body, to facilitate push-and-twist style connections (AKA bayonet connections).

Figure 19:
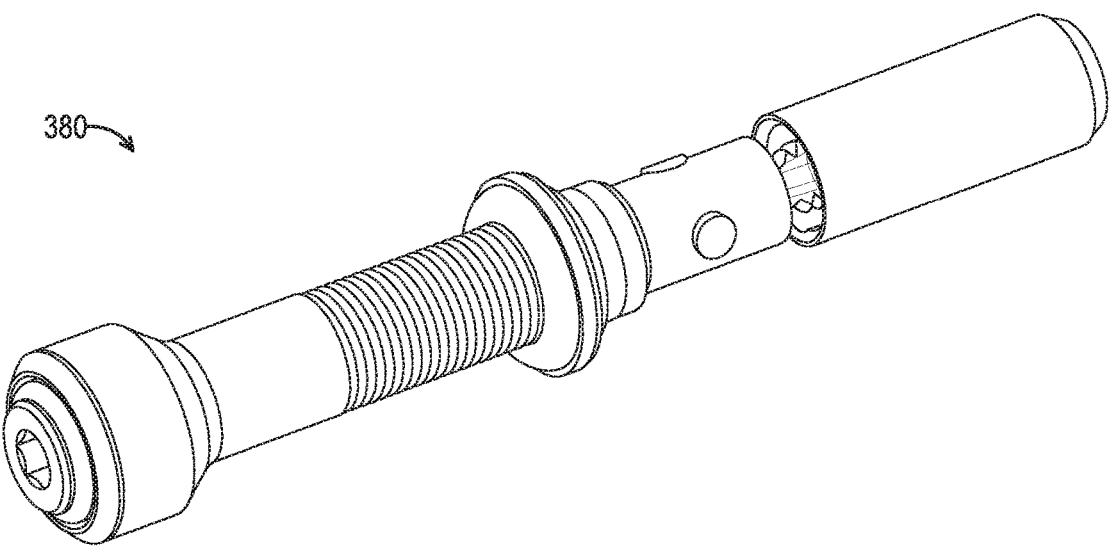
FIG. 19 is an isometric view of another illustrative bicycle valve, in accordance with aspects of the present disclosure.

Valve 380, depicted in FIG. 19, is substantially similar to valve 100, but includes extrusions, pins, or the like 382 disposed near the distal end of the valve body, to facilitate push-and-twist style connections (AKA bayonet connections).

Figure 20:
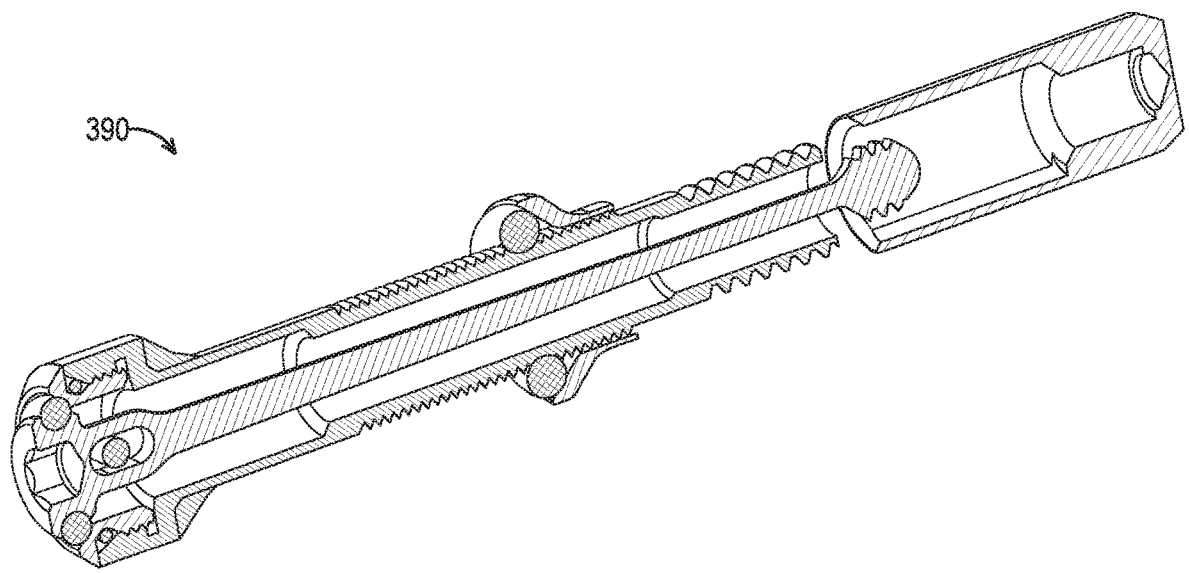
FIG. 20 is a sectional view of another illustrative bicycle valve, in accordance with aspects of the present disclosure.

Valve 390, depicted in FIG. 20, is substantially similar to valve 100, but includes only threads 392 for a standard pump head. Valve 390 does not include a quick connect groove.

Figure 21:
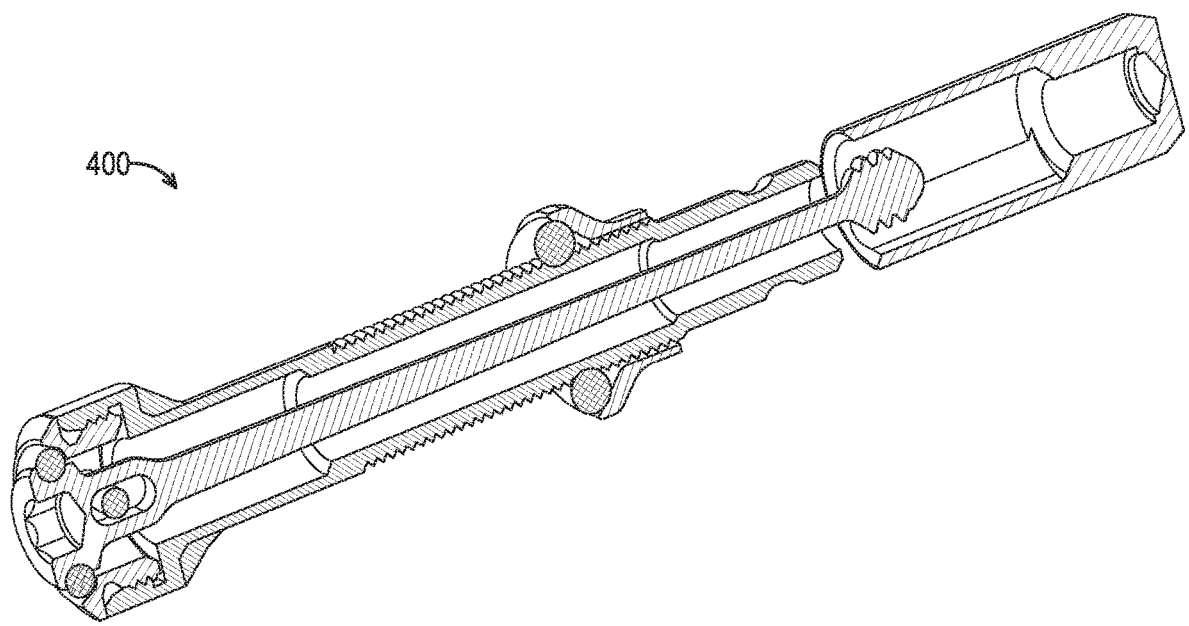
FIG. 21 is a sectional view of another illustrative bicycle valve, in accordance with aspects of the present disclosure.

Valve 400, depicted in FIG. 21, is substantially similar to valve 100, but includes only a quick connect groove 402. Valve 400 does not include threads for a standard pump head.

Figure 22:
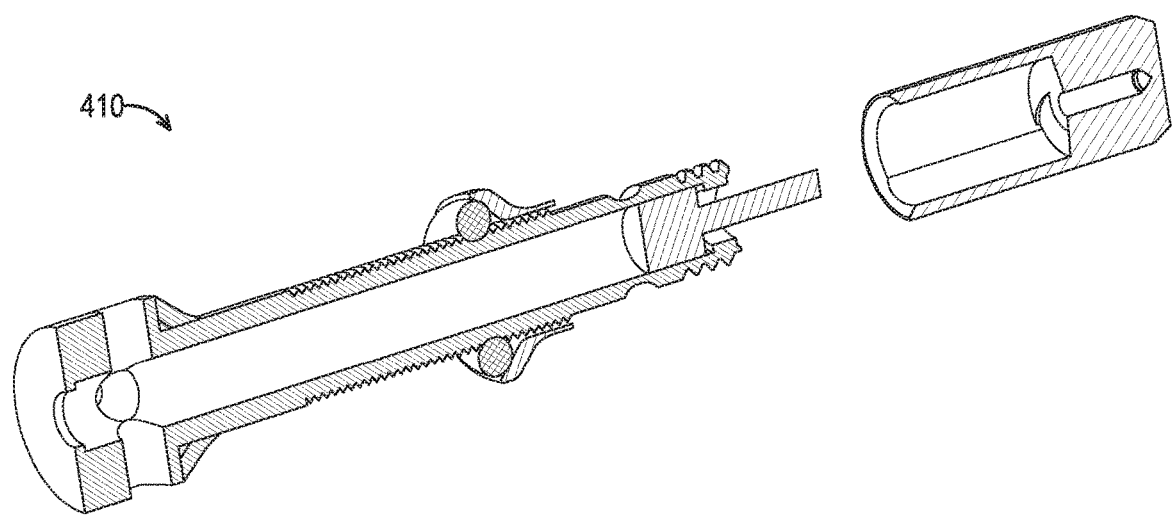
FIG. 22 is a sectional view of another illustrative bicycle valve, in accordance with aspects of the present disclosure.

Valve 412, depicted in FIG. 22, is substantially similar to valve 100, but includes a sliding piston 412 instead of a valve stem. In some examples, the sliding piston includes a threaded end 414 configured to mate with threads of the cap. In some examples, the valve includes a cap configured to seal the valve. When the piston is uncoupled from the cap and the tire is pressurized, the piston may slide to an area inside of the tire, discharging air out of side ports included in the valve.

Figure 23:
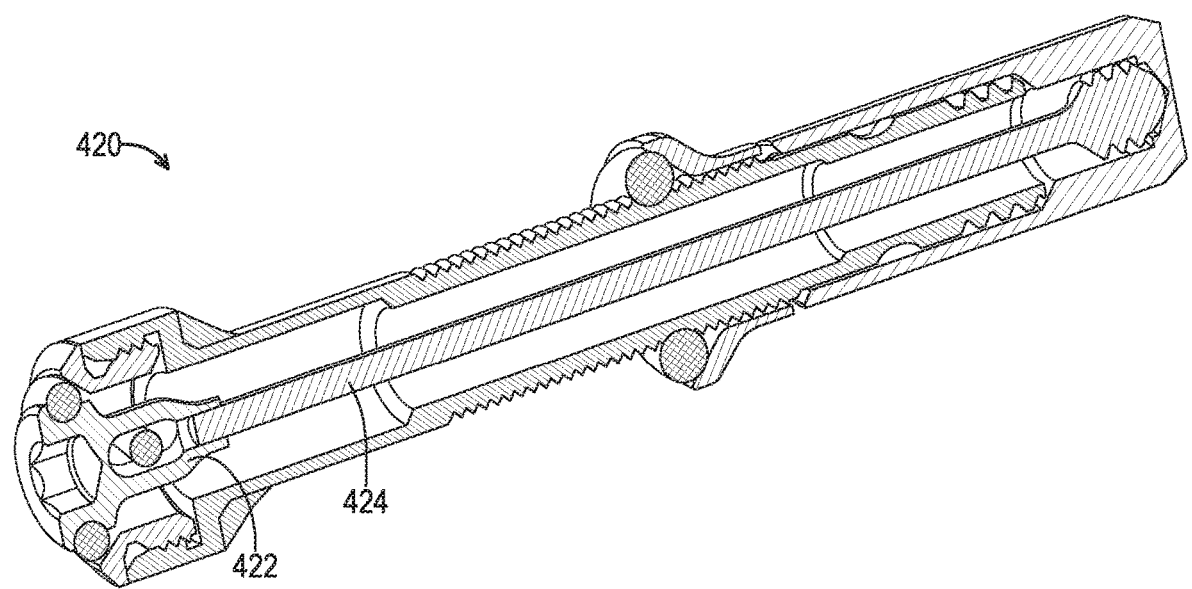
FIG. 23 is a sectional view of another illustrative bicycle valve, in accordance with aspects of the present disclosure.

Valve 420, depicted in FIG. 23, is substantially similar to valve 100, but the valve stem includes multiple distinct pieces 422, 424.

Figure 24:
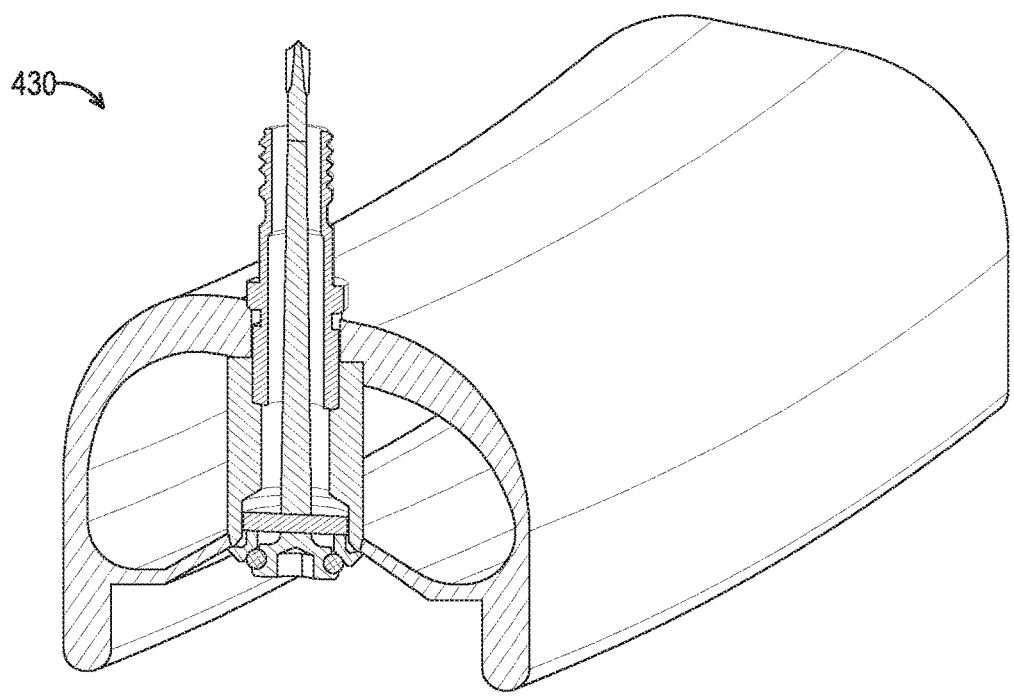
FIG. 24 is a sectional view of another illustrative bicycle valve, integrated into a bicycle rim, in accordance with aspects of the present disclosure.

Valve 430, depicted in FIG. 24, is substantially similar to valve 100, but is included in a bicycle rim 432. In this case, the valve may be shorter and have a larger diameter than valve 100, as the valve does not need to be removable from the rim.

In some examples, valves described above are adapted to work with tubed bicycle tires. The valve body may include exterior threads, which may thread into a nut included on a tubed bicycle.

B. Illustrative Sealant Canister

As seen in FIGS. 25-29, this section describes an illustrative sealant canister 500. Sealant canister 500 includes a cylindrical canister body 510, a valve-to-canister interface 520, and a canister valve 550.

Figure 25:
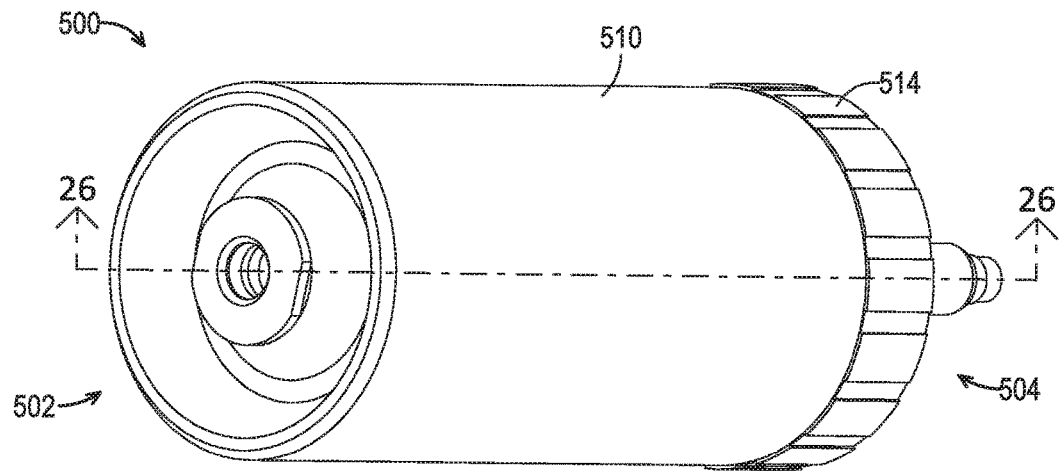
FIG. 25 is an isometric view of an illustrative sealant canister, in accordance with aspects of the present disclosure.

FIG. 25 depicts canister body 510. Cylindrical canister body 510 defines an interior cavity 512 configured to hold sealant. A proximal end 502 of canister body 510 includes an aperture configured to receive valve connector 522. A distal end 504 of canister body 510 includes a sealable cap 514 including an aperture configured to receive canister valve 550. Canister body 510 may be sized to fit between spokes of a bike rim, or may have any suitable size configured to hold a volume of sealant. Canister body 510 may comprise any suitable material, such as aluminum, copper, brass, steel, titanium, plastic, composite, and/or the like. In some examples, canister body 510 has no sealable cap and is used as a funnel through which sealant may be poured into a valve (e.g., valve 100).

Valve-to-canister interface 520 is disposed at the proximal end of canister 500 and includes a valve connector 522, an inner valve 530, and a retaining cap 540 housing inner valve 530. Valve-to-canister interface 520 is configured to receive a tire valve, thereby opening inner valve 530 and enabling a flow of sealant between the canister and the tire valve.

Figure 26:
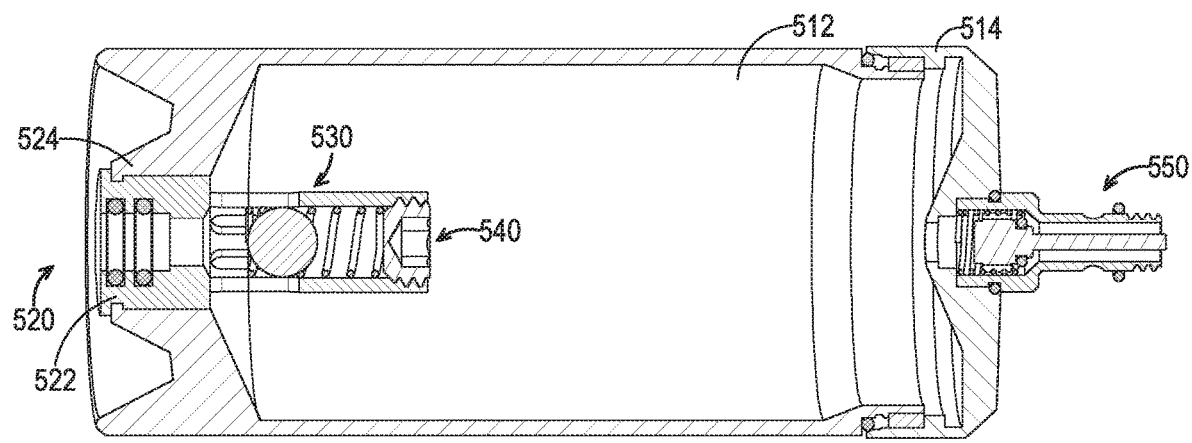
FIG. 26 is a sectional view of the sealant canister of FIG. 25.
Figure 27:
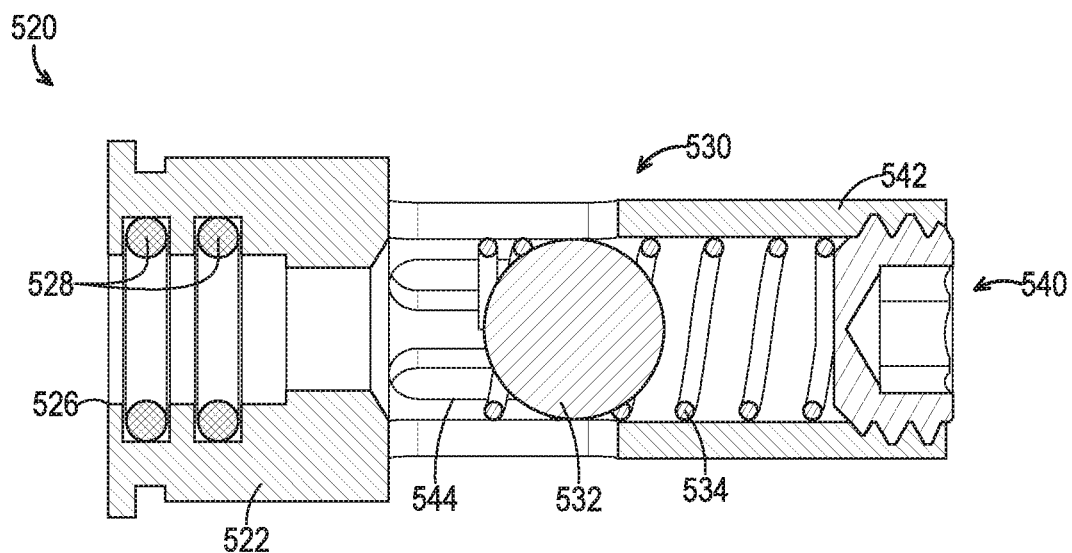
FIG. 27 is a sectional view of a valve-to-canister interface included in the sealant canister of FIG. 25.

Valve connector 522, as depicted in FIG. 26, includes a plurality of wings 524 spaced around a central valve aperture 526. Valve aperture 526 is threaded and includes a resilient sealing member 528 disposed at a proximal end of connector 522. Valve connector 522 threads onto threads disposed at an operating end of a valve (e.g., the distal end of valve 100) and creates a fluid seal with the valve, enabling an introduction sealant to the valve. A distal end of valve connector 522 has a larger diameter than the proximal end, acting as a funnel for sealant into the valve. The distal end of connector 522 also includes threads configured to mate with threads of retaining cap 540. Partially threading a valve onto valve connector 522 produces a seal between the valve and the valve connector. Threading the valve further onto the connector opens inner valve 530. This sequence of sealing the valve to the connector followed by opening the inner valve prevents leakage of sealant through the valve connector and around the valve.

Valve connector 522 may comprise any suitable material, such as brass, copper, aluminum, steel, titanium, plastic, composite, and/or the like. In some examples, valve connector 522 is permanently coupled to or integrated into canister body 510. In some examples, valve connector 522 comprises a plurality of discrete pieces. In some examples, valve connector 522 is disposed on an external surface of canister body 510, and is not received within an aperture formed in sealable cap 514. In some examples, valve connector 522 does not have a threaded connection to the valve, but instead connects with a quick connect fitting, push and twist, and/or any suitable valve connection. In some examples, valve connector 522 is configured to thread onto nose threads of a standard Presta valve.

Inner valve 530 (see FIG. 27) includes a ball 532 and a spring 534. Ball 532 is pressed down by a valve received through the valve connector, enabling a flow of sealant through the valve. Ball 532 may comprise any suitable material, such as Teflon, rubber, copper, brass, steel, titanium, plastic, composite, and/or the like. In some examples, inner valve 530 may be a check valve, a duck valve, or any suitable valve which may be activated by the insertion of a valve into the valve-to-canister interface.

Retaining cap 540 houses inner valve 530 and is threaded onto threads disposed at the distal end of valve connector 522. Cap 540 includes a tubular housing 542 configured to surround inner valve 530, and slots 544 spaced around a circumference of tubular housing 542, which are configured to filter out large particles from sealant contained in the canister. In use, sealant flows through the slots and through inner valve 530 before injection into the bicycle valve. Retaining cap 540 and inner valve 530 are both designed to allow a higher flow rate than canister valve 550 to prevent over-pressurization of the canister. Cap 540 has threads configured to mate with threads of valve connector 522 disposed at a proximal end.

Cap 540 may comprise any suitable material, such as brass, copper, aluminum, steel, titanium, plastic, composite, and/or the like. In some examples, cap 540 is permanently coupled to or integrated into valve connector 522. In some examples, cap 540 includes any suitable filtering mechanism.

Figure 28:
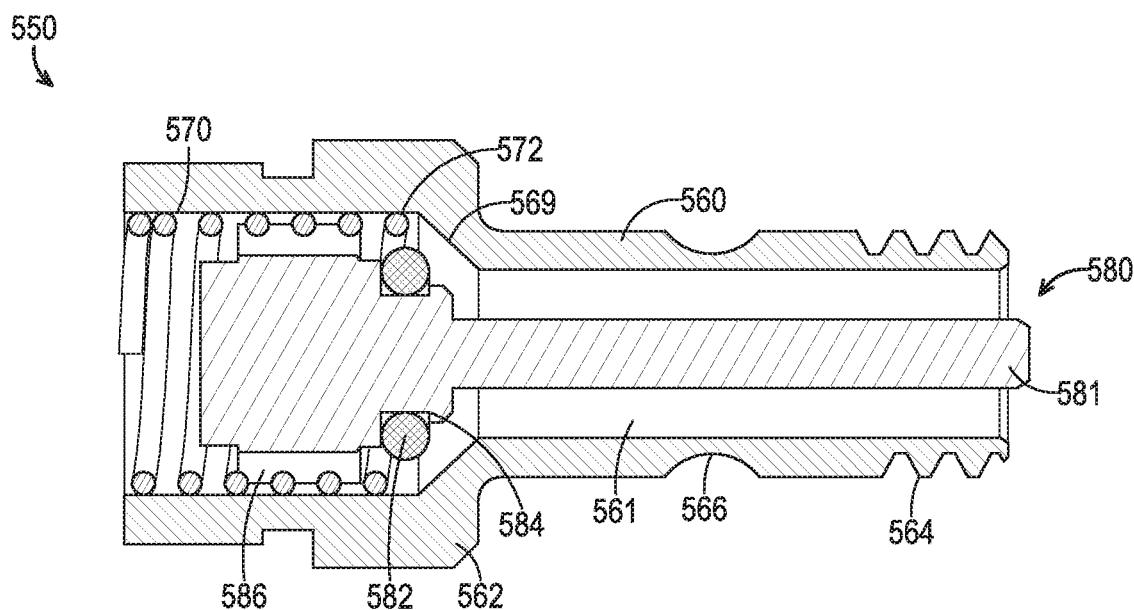
FIG. 28 is a sectional view of a canister valve included in the sealant canister of FIG. 25.

Canister valve 550 is disposed at the distal end of canister 500, directly opposite valve-to-canister interface 520. Canister valve 550, as depicted in FIG. 28, includes a valve housing 560, a valve screw 570, and a valve stem 580. Canister valve 550 is configured to be coupled to a head of a bicycle pump, which pressurizes the sealant canister. This configuration allows sealant to be injected into a bicycle tire while the tire is pressurized, and allows for simultaneous tire inflation and sealant addition.

Valve housing 560 comprises a roughly cylindrical valve body defining an interior cavity 561 and having a flared portion 562 disposed at a proximal end of the valve housing. An interior surface of flared portion 562 forms a valve seat 569, against which resilient seating member 582 seals when the valve is in a closed position. Valve housing 560 includes threads 564 and a circumferential groove 566 disposed on an outer surface of the housing adjacent to a distal end. Flared portion 562 is configured to house a resilient seating member 582 of the valve rod, and includes threads configured to mate with threads of the valve screw.

Valve housing 560 may comprise any suitable material, such as aluminum, copper, brass, steel, titanium, plastic, composite, and/or the like. In some examples, valve housing 560 is permanently coupled to or integrated into canister body 510.

Valve screw 570 mates with the threads of the valve housing, and is configured to encapsulate valve spring 572. Valve screw 570 may comprise any suitable material such as brass, copper, aluminum, steel, titanium, plastic, composite, and/or the like. In some examples, valve screw 570 is permanently coupled to or integrated into valve housing 560.

Valve stem 580 includes a shaft 581 extending through interior cavity 561 of valve housing 560. Valve stem 580 includes a resilient seating member 582 received within a circumferential channel 584 disposed at a proximal end of the valve shaft. In some examples, resilient seating member 582 may include an O-ring. Resilient seating surface 582 may comprise any suitable resilient material, such as rubber, resilient polymer, and/or the like. Valve stem 580 further includes a spring retaining feature 586. A distal end of shaft 581 protrudes from a distal end of the valve housing, allowing a user to press on the valve shaft and release air from the canister. Valve stem 580 may comprise any suitable material, such as brass, copper, aluminum, steel, titanium, plastic, composite, and/or the like.

Translating valve stem 580 toward the proximal end of the valve opens the valve by moving seating surface 582 away from valve seat 569, breaking the seal between them. Spring 572 provides a spring force which keeps the valve in the closed position.

In some examples, canister valve 550 is a check valve, ball valve, and/or any suitable valve for fluid containers. In some examples, canister 500 does not include a canister valve. In some examples, canister valve 550 is configured to mate with a pump head of a carbon dioxide tank or a tank for any other pressurized gas. In some examples, canister 500 includes only a canister body, a valve-to-canister connector on one end, and a valve to pressurized air source connector on the other end.

Figure 29:
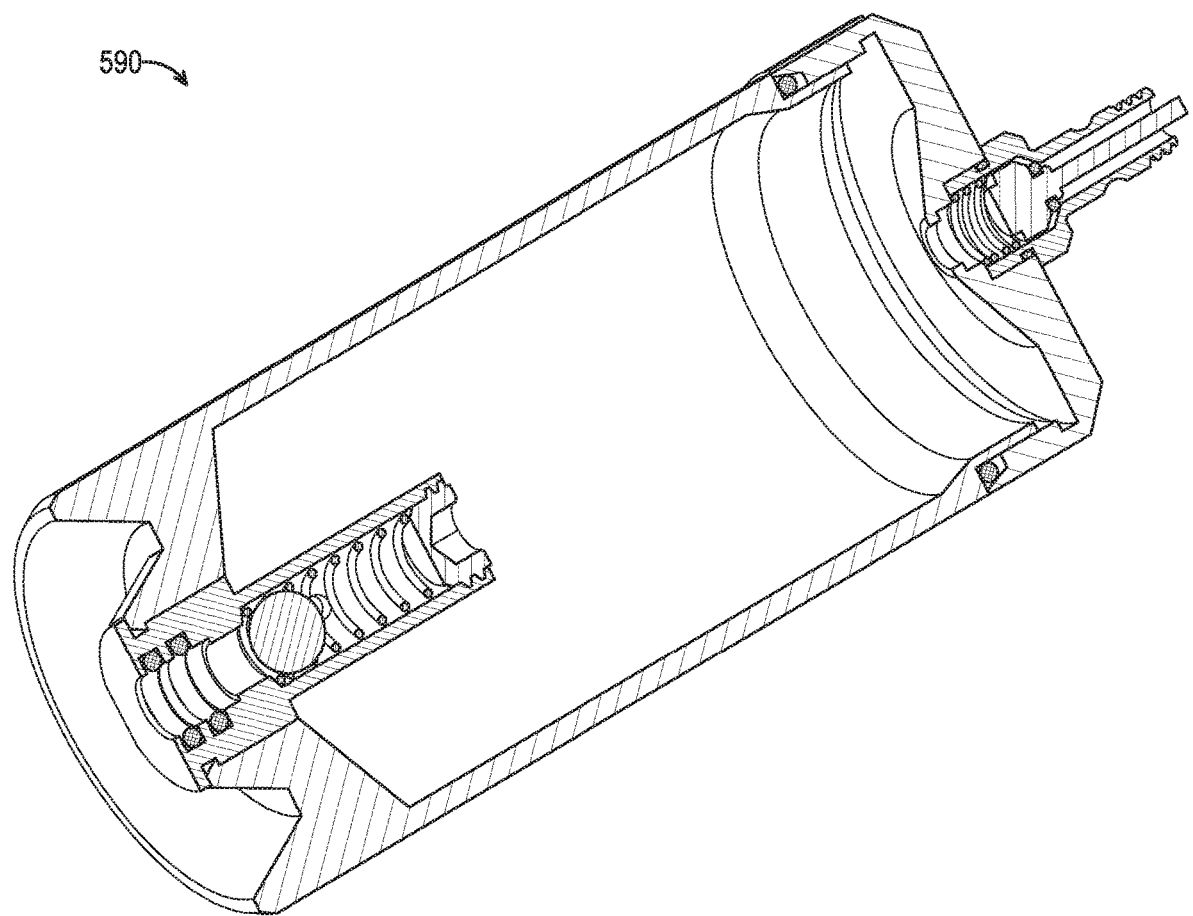
FIG. 29 is a sectional view of another illustrative sealant canister, in accordance with aspects of the present disclosure.

An additional exemplary sealant canister 590 according to the present disclosure is illustrated in FIG. 29. Sealant canister 590 is substantially identical to canister 500, but a valve-to-canister connector 592 (e.g., valve-to-canister connector 520) is disposed on an external surface of canister 500. In some examples, the valve-to-canister connector is removable.

C. Illustrative Pump Head

Figure 30:
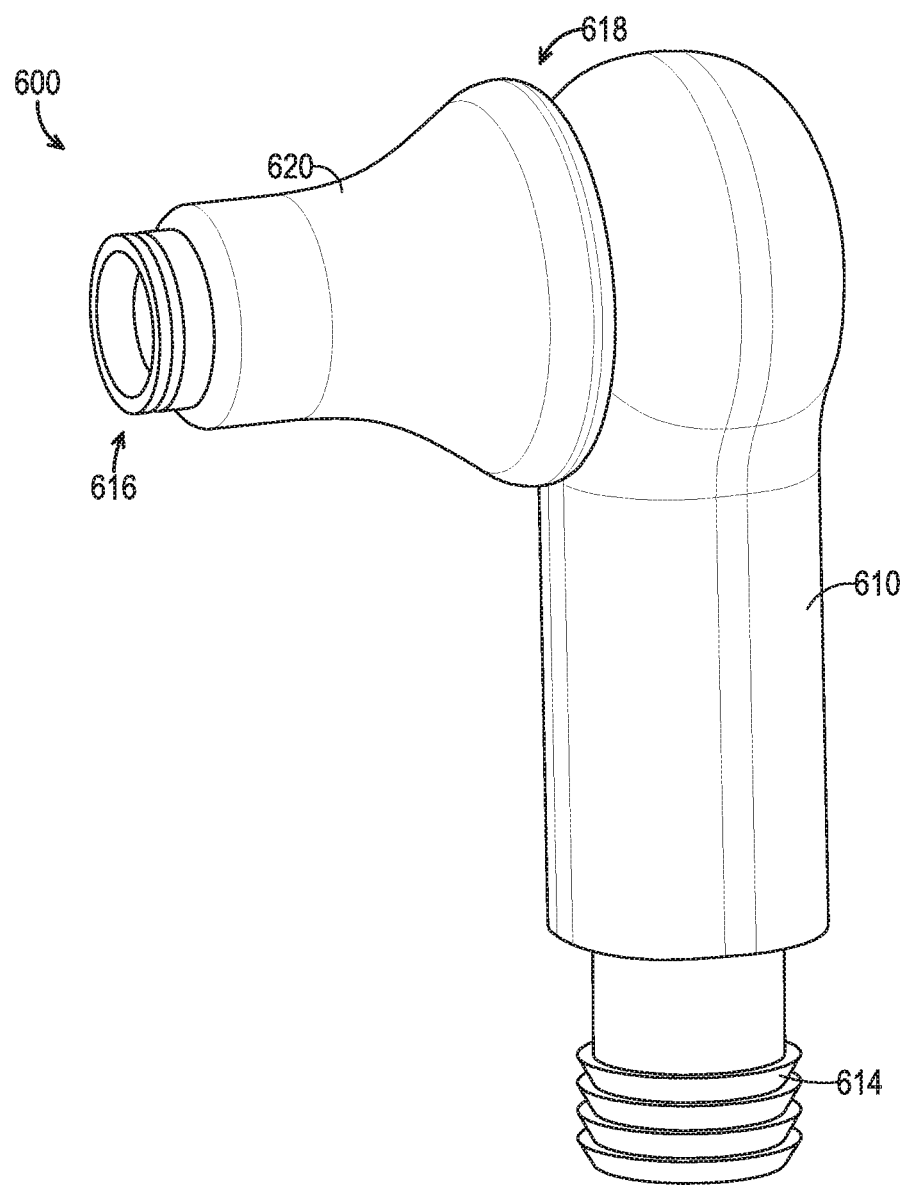
FIG. 30 is an isometric view of an illustrative pump head, in accordance with aspects of the present disclosure.
Figure 31:
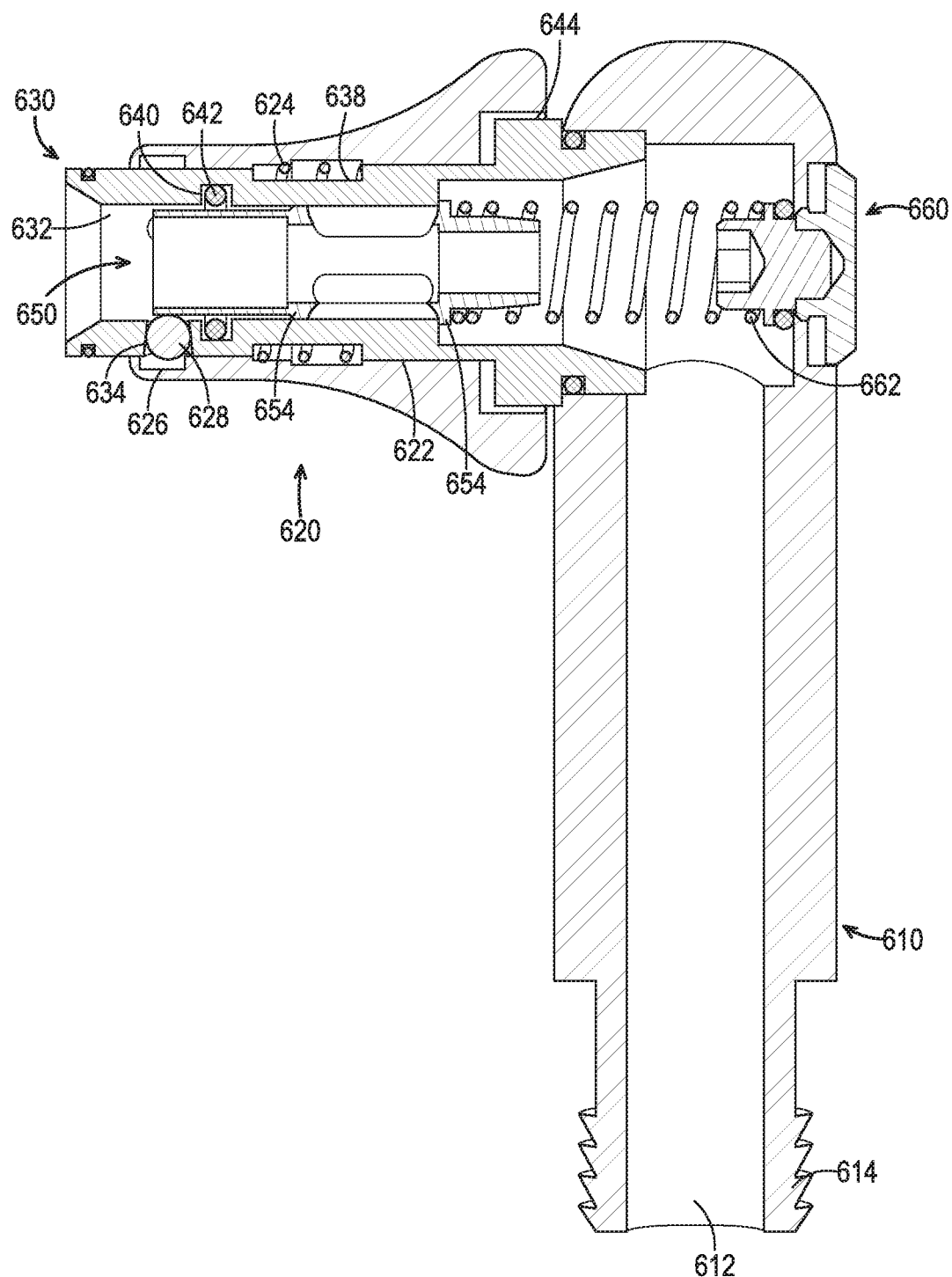
FIG. 31 is a sectional view of the pump head of FIG. 30.

As depicted in FIGS. 30-31, this section describes an illustrative pump head 600, which is configured to connect to a valve (e.g., a bicycle valve, such as valve 100, or a canister valve, such as valve 550). Pump head 600 includes a pump head body 610 connected to a collar 620, which collectively define an interior cavity including a quick connect fitting 630, a plunger 650, and a plunger housing 660. Collar 620 and quick connect fitting 630 form a connection between the pump head and the valve body.

Pump head body 610 (see FIG. 30) includes two cylindrical bodies coupled orthogonally to each other, such that an end of a first cylindrical body is coupled to a side of a second cylindrical body. The two cylindrical bodies define an air channel 612, through which air may enter the pump head. Air channel 612 includes two channel legs disposed orthogonal to each other, the first of which extends along a major axis of the first cylindrical body, and the second of which extends along a major axis of the second cylindrical body and which exits the pump head body near a closed end of body 610. Body 610 includes threads 614 disposed at a distal end, which may connect to a hose of an air source. Body 610 also includes plunger housing 660 disposed within air channel 612. Pump head body 610 may comprise any suitable material, including plastic, copper, brass, steel, titanium, aluminum, composite, and/or the like. In some examples, body 610 includes a sliding toggle, allowing a user to translate the air channel between different pump head styles coupled to the pump head body. In some examples, body 610 is removably couplable to valve adapters, such as valve core adapters of the present disclosure.

Collar 620 (see FIG. 31) defines an interior channel 622 extending between a distal end 616 of the collar and a proximal end 618 of the collar, with interior channel 622 being directly connected to air channel 612. Collar 620 includes a spring 624 disposed at the distal end of the channel, which biases the collar toward a forward position. Collar 620 includes a relief, channel, or recess 626 disposed around an interior surface of the cap end of the channel which is configured to receive ball bearings 628. An interior surface of collar 620 is smooth, to allow the collar to slide along quick connect fitting 630.

Collar 620 may comprise any suitable material, such as aluminum, copper, brass, steel, titanium, plastic, composite, and/or the like. Collar 620 is substantially frustoconical, with a base of the collar having a diameter similar to a diameter of the second cylindrical body of body 610. In some examples, collar 620 may be flared, cylindrical, conical, and/or have any suitable shape which facilitates coupling between the proximal end of the collar and a valve. In some examples, collar 620 does not include a spring and a user of the pump head may manually slide the collar into the forward position.

Quick connect fitting 630 is received within the channel of collar 620. Collar 620 moves relative to quick connect body 630, and is translatable between a forward position and a retracted position. When collar 620 is in the forward position, bearings 628 are pressed against the collar interior surface, rendering the bearings immobile. When collar 620 is in a retracted position, bearings 628 are received by recess 626, and the bearings are free to spin.

Coupling a valve to the pump head may include: pulling the collar into a retracted position and sliding the valve into the pump head so that bearings 628 are received within the quick connect groove, and releasing the collar, securing the bearings within the quick connect groove. Uncoupling a valve from the pump head may include pulling the collar into a retracted position and sliding the pump head away from the valve.

Quick connect fitting 630 includes walls defining a channel 632. Fitting 630 includes tapered holes or apertures 634 configured to capture bearings 628 disposed at a distal end of the fitting walls. Bearings 628 are free to move toward a center of the channel or away from a center of the channel (e.g., to protrude beyond the walls into recess 626), depending on the position of the collar. In some examples, an outer surface of the distal end of fitting 630 includes a relief, recess, or groove configured to retain a c-clip configured to retain collar 620. The outer surface includes a step or flange 638 configured to retain spring 624 in conjunction with collar 620. An inner surface of the distal end of fitting 630 includes a circumferential channel 640 configured to hold a resilient sealing member 642 (e.g., an O-ring). Resilient sealing member 642 is configured to seal to the valve body (e.g., of valve 100) between threads (e.g., for a cap or standard pump) and the quick connect grooves.

At a proximal end of the fitting, an inner surface of fitting 630 includes a bore, step, or flange 644 configured to act as a stop for plunger 650. The proximal end of the inner surface of fitting 630 also includes threads configured to mate with threads of plunger housing 660.

Quick connect fitting 630 may comprise any suitable material, such as stainless steel, copper, brass, aluminum, titanium, plastic, composite, and/or the like. In some examples, fitting 630 is configured to couple to a valve including a push and twist valve (e.g., by including pins or extrusions to mate with slots on valve), a standard valve (e.g., by including threads), or a valve including any other suitable form of attachment.

Plunger 650 includes a tubular body 652 and is configured to extend and retract within plunger housing 660 and quick connect fitting 630 to mate with a valve body received within the pump head. A tip, rod, or stem of a valve disposed within the pump head is received by a channel defined by walls of tubular body 652. An outer surface of plunger 650 includes a flange 654 configured to contact flange 644 on a distal side, preventing the plunger from ejecting from the quick connect fitting. A proximal side of flange 654 provides a surface against which a plunger spring 662 may push, biasing the plunger in a forward position. An outer surface of the plunger may include a relief, recess, or channel which may receive resilient sealing member 642 when the pump head is not connected to a valve. Plunger 650 may comprise any suitable material, such as brass, copper, aluminum, steel, titanium, plastic, composite, and/or the like. In some examples, plunger 650 includes slots configured to allow air flow. In some examples, air may flow around plunger 650.

Plunger housing 660 is configured to house plunger 650 and plunger spring 662. Plunger 650 slides against an inner surface of housing 660 during pump operation, and collar 620 slides against an outer surface of housing 660. Housing 660 includes external threads 654 configured to mate with threads of quick connect body 630. Housing 660 includes air channels disposed at a proximal end, which interface with air channel 612 of pump head body 610, conducting air from body 610 to collar channel 622.

Plunger housing 660 may comprise any suitable material, such as brass, copper, aluminum, steel, titanium, plastic, or composite. In some examples, plunger housing 660 includes threads configured to interface with valves including standard threaded connections. In some examples, housing 660 is permanently coupled to or integrated into pump head body 610. In some examples, housing 660 acts as a sliding toggle feature, moving airflow between two or more different air channels and respective pump heads. In some examples, plunger housing 660 may include threads or other fittings configured to attach to valve adapters.

In some examples, pump head 600 may include a standard threaded pump connection. In some examples, pump head 600 may include a push-and-twist pump connection (AKA a bayonet connection). In some examples, pump head 600 may be configured to conduct both air and sealant. In some examples, pump head 600 may include a valve depressor configured to apply pressure to a stem of a closed tire valve.

Figure 32:
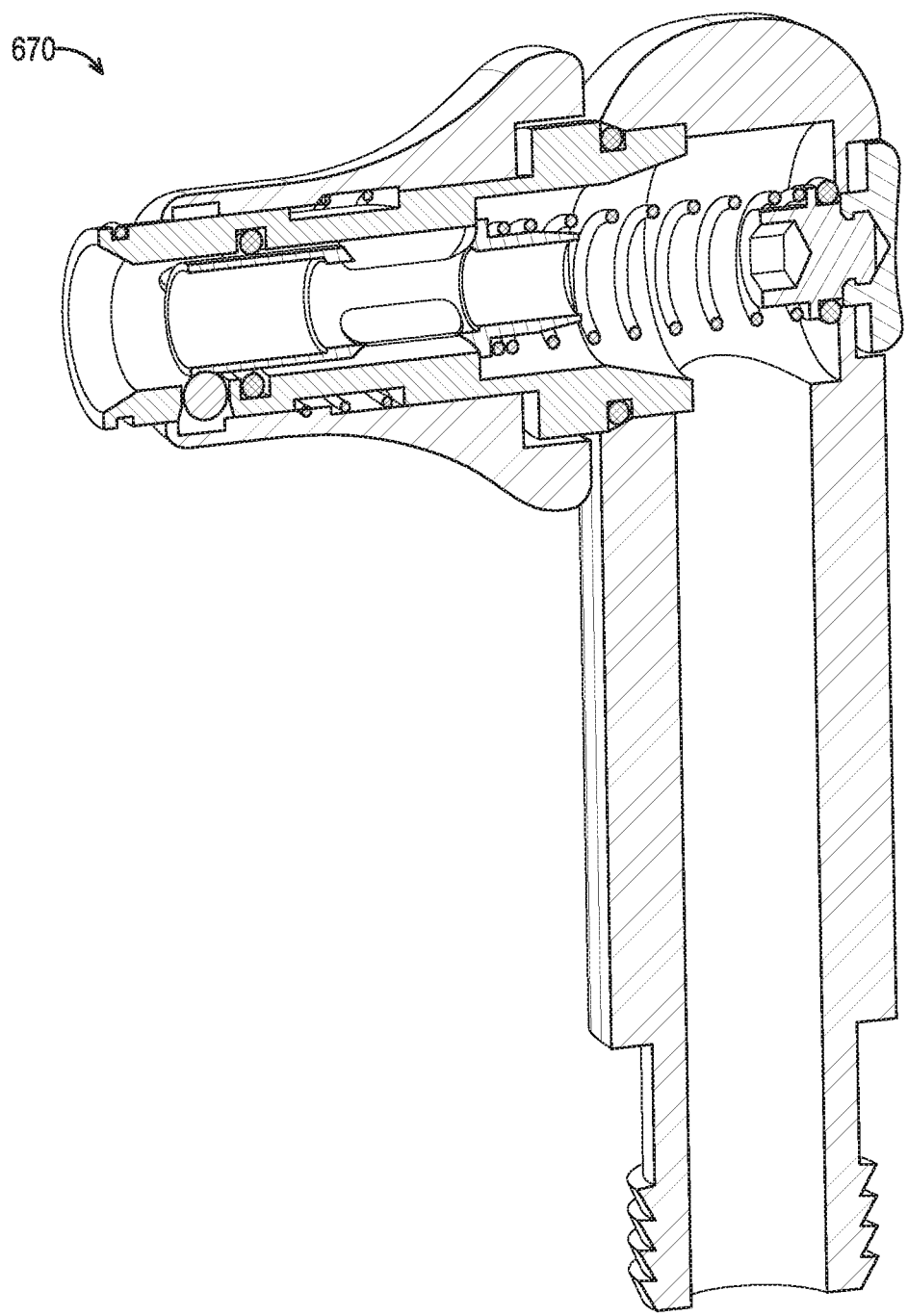
FIG. 32 is an oblique sectional view of another illustrative pump head, in accordance with aspects of the present disclosure.

An additional exemplary pump head 670 according to the present disclosure is illustrated in FIG. 32. Pump head 670 may be substantially identical to pump head 600, but may include an air pressure release button 672.

D. Illustrative Valve Core Adapters

As depicted in FIGS. 33-37, this section describes illustrative valve core adapters. Valve core adapters in accordance with aspects of the present disclosure may include an adapter body, a valve rod, a nut, and a rubber seal. Valve core adapters screw onto valve bodies of previously installed bicycle valves. Instead of replacing the valve, or replacing the internal valve core, illustrative valve core adapters described below perform the function of a valve core while remaining external to a bicycle rim. Valve core adapters described below may also be designed to work with pump head 600, and so may enable a cyclist with a different bicycle valve to use a pump including pump head 600.

Figure 33:
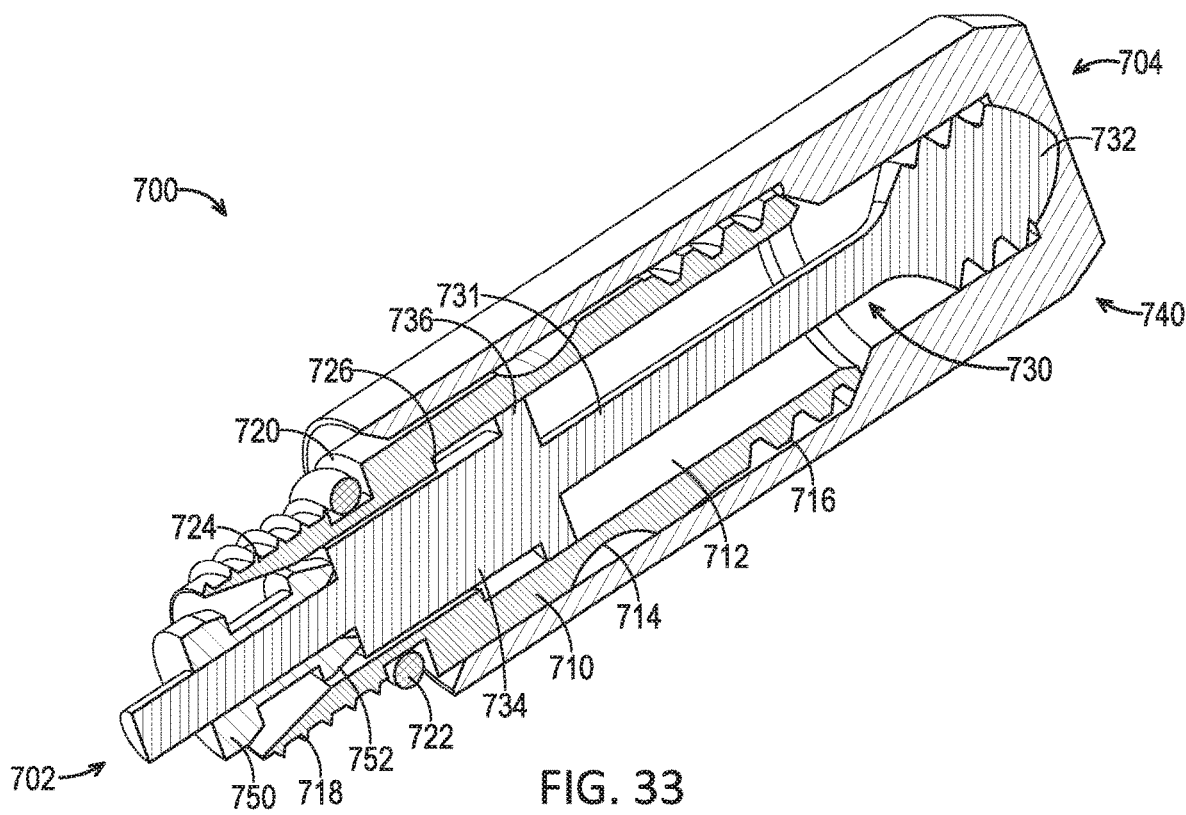
FIG. 33 is an oblique sectional view of a valve core adapter, suitable for use in a Presta valve body, in accordance with aspects of the present disclosure.
Figure 34:
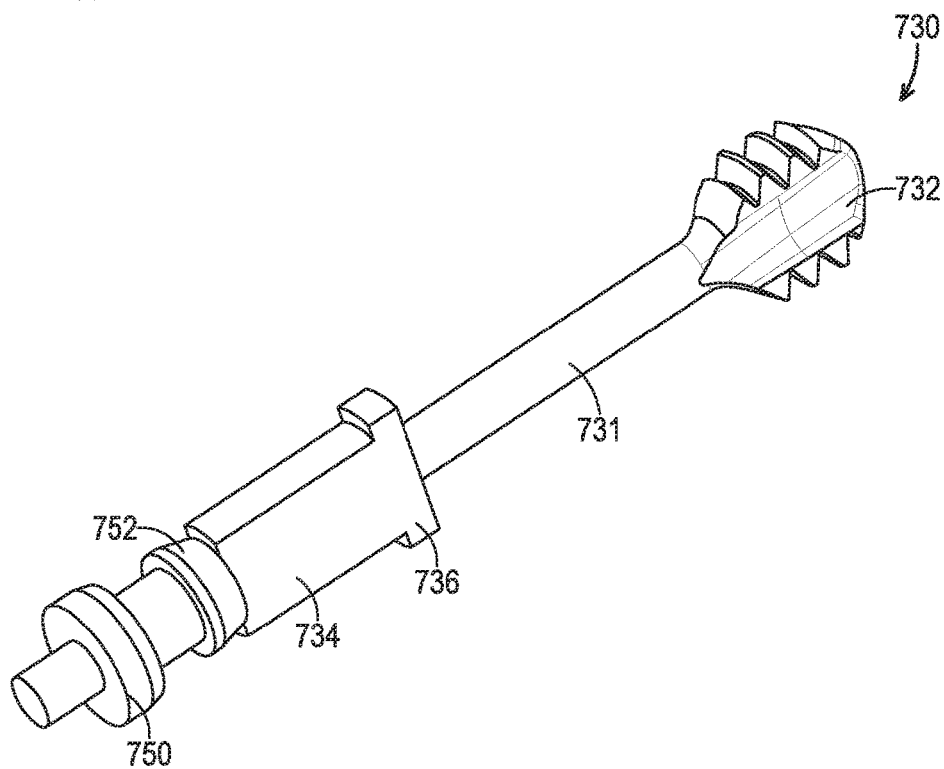
FIG. 34 is a valve stem and resilient seating surface, suitable for inclusion in the valve core adapter of FIG. 33.

A valve core adapter 700 suitable for use with a Presta valve is illustrated in FIGS. 33-34, and includes an adapter body 710, a valve stem or rod 730, a cap 740, and a resilient seating member 750.

Adapter body 710 defines an interior channel 712. A distal end 704 of adapter body 710 includes a circumferential groove (AKA quick connect groove) 714 and threads 716 for interface with standard pump heads. In some examples, threads 716 may be flattened so that an O-ring or other sealing mechanism of a pump head (e.g., of pump head 600) is not subjected to undue wear. In some examples, threads 716 may be configured to mate with threads of a valve cap.

A proximal end of adapter body 710 includes threads 718, which are configured to mate with internal threads of a Presta valve body. A circumferential channel 720 configured to receive a resilient sealing member 722 is disposed adjacent to threads 718. In some examples, resilient sealing member 722 is an O-ring. Resilient sealing member 722 may comprise any suitable material, such as rubber, resilient polymer, and/or any other resilient material. An interior surface of the proximal end tapers inward, providing a seat 724 for resilient seating surface 752 of resilient seating member 750 750. A flange 726 is disposed adjacent to seat 724, and provides a stop for valve stem 730. In some examples, an internal surface of adapter body 710 includes grooves configured to prevent valve stem 730 from rotating.

Adapter body 710 may comprise any suitable material, such as aluminum, copper, brass, steel, titanium, plastic, or composite. In some examples, adapter body 710 has sealing glue instead of including resilient sealing member 722. In some examples, adapter body 710 includes external flats, which may facilitate tightening by a user (e.g., using a wrench). In some examples, adapter body 710 includes only a quick connect groove, and does not include threads for a standard bicycle pump. In some examples, adapter body 710 includes only threads for a standard bicycle pump, and does not include a quick connect groove. In some examples, adapter body 710 includes either extrusions or slots for a push and twist connection. In some examples, adapter body 710 includes additional features configured to couple the valve stem to the valve body (e.g., retaining mechanism 160). In some examples, adapter body 710 includes threads configured to mate with external threads of a Presta valve body. In some examples, adapter body 710 is configured to accept a Presta valve core.

Valve stem 730 extends through adapter body 710, allowing a release of air through the valve adapter. Stem 730 includes a shaft 731 having a threaded end 732 disposed at a distal end, and a retention mechanism 734 disposed near a proximal end. Threaded end 732 is substantially identical to threaded end 150 of valve 100. Retention mechanism 734 includes a rectangular body having protrusions 736 extending from a distal end. Protrusions 736 are configured abut flange 726, retaining the valve stem within the adapter body. Retention mechanism 734 prevents rotation of the valve stem when the rectangular body is received within internal grooves of the adapter body. Shaft 731 may extend proximally, beyond retention mechanism 734, allowing for resilient seating member 750 to slide onto the shaft. Valve stem 730 may comprise any suitable material, including brass, copper, aluminum, steel, titanium, plastic, composite, and/or the like.

Cap 740 may cover the distal end of valve core adapter 700. Cap 740 is substantially identical to cap 130 of valve 100. Cap 740 threads onto valve stem 730, and facilitates air release while connected to valve stem 730. Cap 740 may comprise any suitable materials, such as brass, copper, aluminum, steel, titanium, plastic, composite, and/or the like.

Resilient seating member 750 defines a resilient seating surface 752 may include any suitable resilient seal for a valve. Resilient seating surface 752 includes a central hole or aperture configured to receive valve stem 730. As valve stem 730 moves toward the proximal end of the adapter body, the resilient seating surface is moved away from seat 724, breaking the valve seal. In some examples, resilient seating member 750 includes a conical seal. In some examples, resilient seating member 750 includes an O-ring. Resilient seating surface 750 may comprise any suitable material, such as rubber, resilient polymer, and/or the like.

Figure 35:
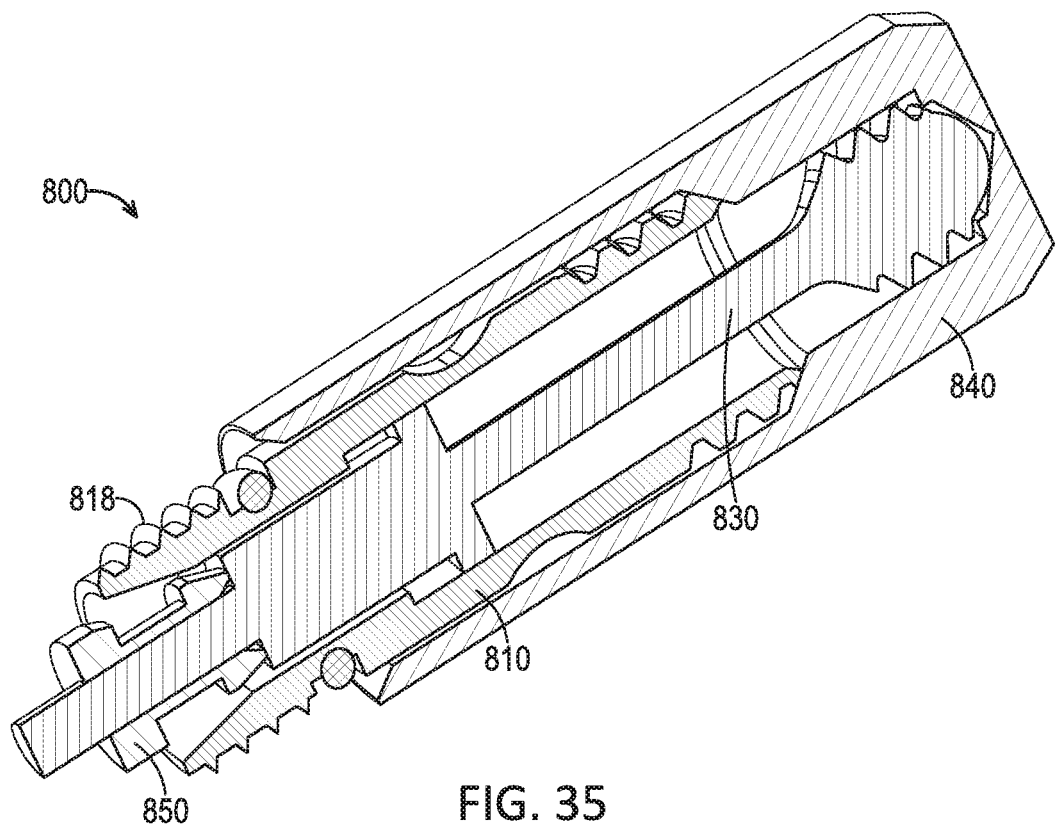
FIG. 35 is an oblique sectional view of a valve core adapter, suitable for use in a Schrader valve body, in accordance with aspects of the present disclosure.
Figure 36:
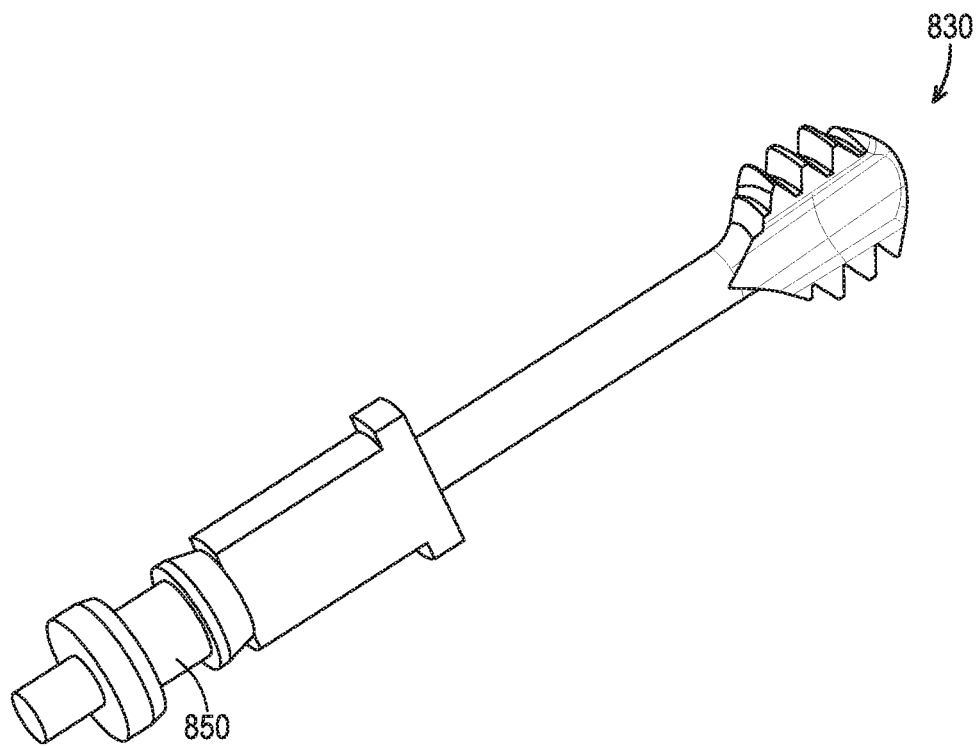
FIG. 36 is a valve stem and resilient seating surface, suitable for inclusion in the valve core adapter of FIG. 35.

A valve core adapter 800 suitable for use with a Schrader valve is illustrated in FIGS. 35-36, and includes an adapter body 810 defining an interior channel 812 and having a valve seat 824 at a proximal end, a valve rod or stem 830 including a threaded end 832, a cap 840, and a resilient seating member 850. Valve core adapter 800 is substantially identical to valve core adapter 700, except that valve core adapter 800 includes threads 818 configured to mate with internal threads of a Schrader valve.

In some examples, a valve core adapter (e.g., adapter 700, adapter 800) may be included with a floor bicycle pump, and may be configured to be received by adapter holders coupled to the bicycle pump. In some examples, a valve core adapter (e.g., adapter 700, adapter 800) may include a spring.

Figure 37:
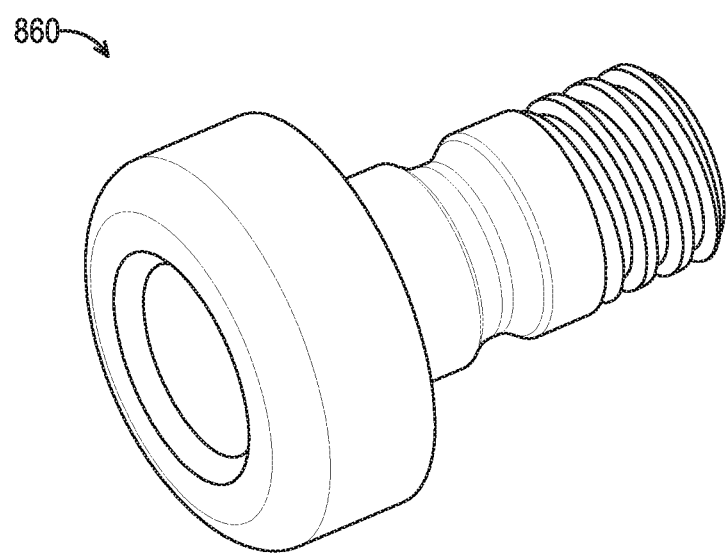
FIG. 37 is an isometric view of another illustrative valve core adapter, in accordance with aspects of the present disclosure.

An additional valve core adapter 860 according to the present disclosure is illustrated in FIG. 37. Valve core adapter 860 may be configured to connect a valve of the present valve disclosure (e.g., valve 100) to a pump head including a Presta valve or a Schrader valve. Valve core adapter 860 includes a pump head interface 862 at a first end and a valve interface 864 at a second end.

E. Illustrative System for Inflating a Tubeless Bicycle Tire

Figure 38:
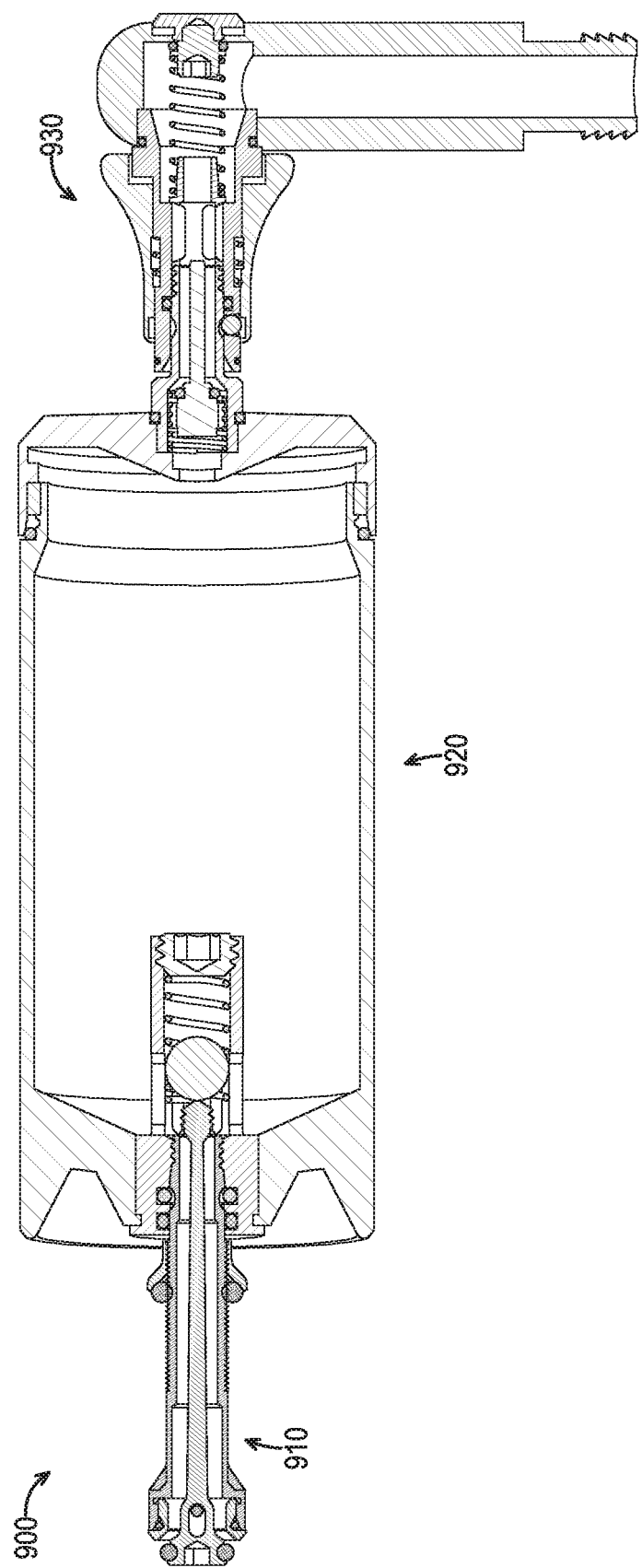
FIG. 38 is a sectional view of an illustrative system for injecting sealant into a tubeless tire, depicting: a valve, a sealant canister, and a pump head.

An illustrative inflation system 900 for a tubeless bicycle tire is depicted in FIG. 38. Inflation system 900 includes a valve 910, a sealant canister 920, and a pump head 930. Valve 910 is substantially identical to valve 100, sealant canister 920 is substantially identical to canister 500, and pump head 930 is substantially identical to pump head 600.

Inflation system 900 facilitates addition of sealant to a pressurized or fully deflated tire by a user. Valve 910 is generally installed in a bicycle rim for a tubeless bike tire. Coupling sealant canister 920 to valve 910 and pump head 930 to sealant canister allows a user to deliver a sealant and air mixture to the tire (in contrast to current methods, which involve injection of sealant into the valve of a deflated tire).

In some examples, such as when the valve, canister, and pump head are identical to valve 100, canister 500, and pump head 600, a valve-to-canister connector may be coupled to the valve, enabling a flow of sealant to the valve. The pump head may be coupled to a canister valve disposed opposite to the valve-to-canister connector. Coupling the components together, as illustrated in FIG. 900 provides an air channel through which an air-sealant mixture may be delivered to the tire.

In some examples, components of inflation system 900 may be combined or irreversibly coupled together. For example, sealant canister 920 could be permanently connected to or integrated into pump head 930.

F. Illustrative Method for Releasing Air from a Valve

Figure 39:
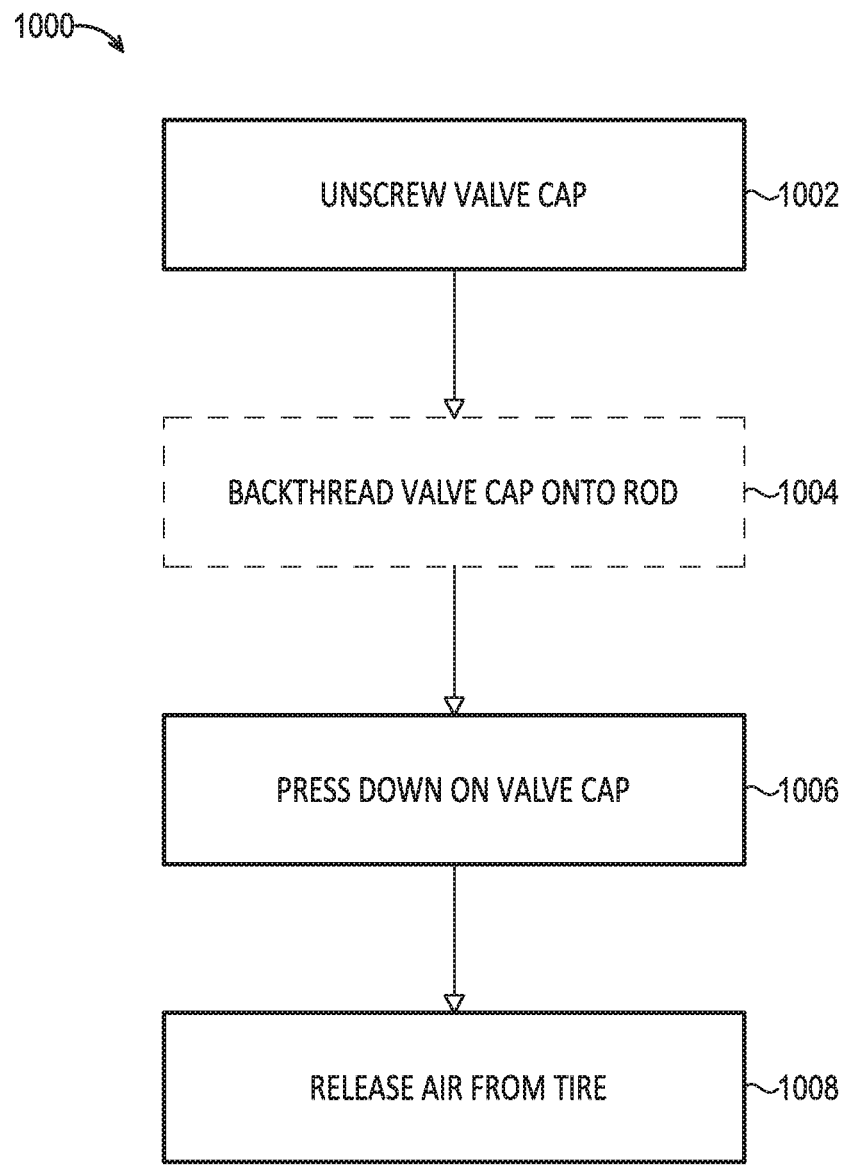
FIG. 39 is a flow chart depicting steps of an illustrative method for releasing air from a bicycle valve according to the present teachings.

This section describes steps of an illustrative method 1000 for releasing air from a valve; see FIG. 39. This method is described with respect to valve 100, and components of valve 100 may be utilized in the method steps described below. Where appropriate, reference may be made to components and systems that may be used in carrying out each step. These references are for illustration, and are not intended to limit the possible ways of carrying out any particular step of the method.

FIG. 39 is a flowchart illustrating steps performed in an illustrative method, and may not recite the complete process or all steps of the method. Although various steps of method 1000 are described below and depicted in FIG. 39, the steps need not necessarily all be performed, and in some cases may be performed simultaneously or in a different order than the order shown.

Step 1002 of method 1000 includes unscrewing valve cap 130 from valve 100. Step 1002 may include fully or partially unscrewing valve cap 130 from valve stem 120. In some examples, step 1002 includes partially unscrewing the valve cap, such that the valve cap remains connected to the threaded end of the valve stem. In some examples, step 1002 includes fully unscrewing the valve cap and removing the valve cap from the valve stem.

Step 1004 of method 200 optionally includes backthreading valve cap 130 onto valve stem 120. This may involve threading a fully unscrewed valve cap one turn in a direction opposite to a typical direction of threading (e.g., the valve cap typically turns clockwise to tighten and is instead threaded counterclockwise onto the valve stem). This may ensure that valve flow is not limited by interior surfaces of the valve cap contacting the distal end of the valve body.

Step 206 of method 200 includes pressing valve cap 130 toward the proximal end of valve 100. As the valve cap is threaded onto the threaded end of the valve stem, pressing the valve cap toward the proximal end of the valve also moves the valve stem.

Step 208 of method 200 includes releasing a selected amount of air from the tubeless tire. Moving valve stem 120 unseats resilient seating member 123 from valve seat 168. This allows air to be released from the tire.

G. Illustrative Method for Installing a Tubeless Bicycle Tire

Figure 40:
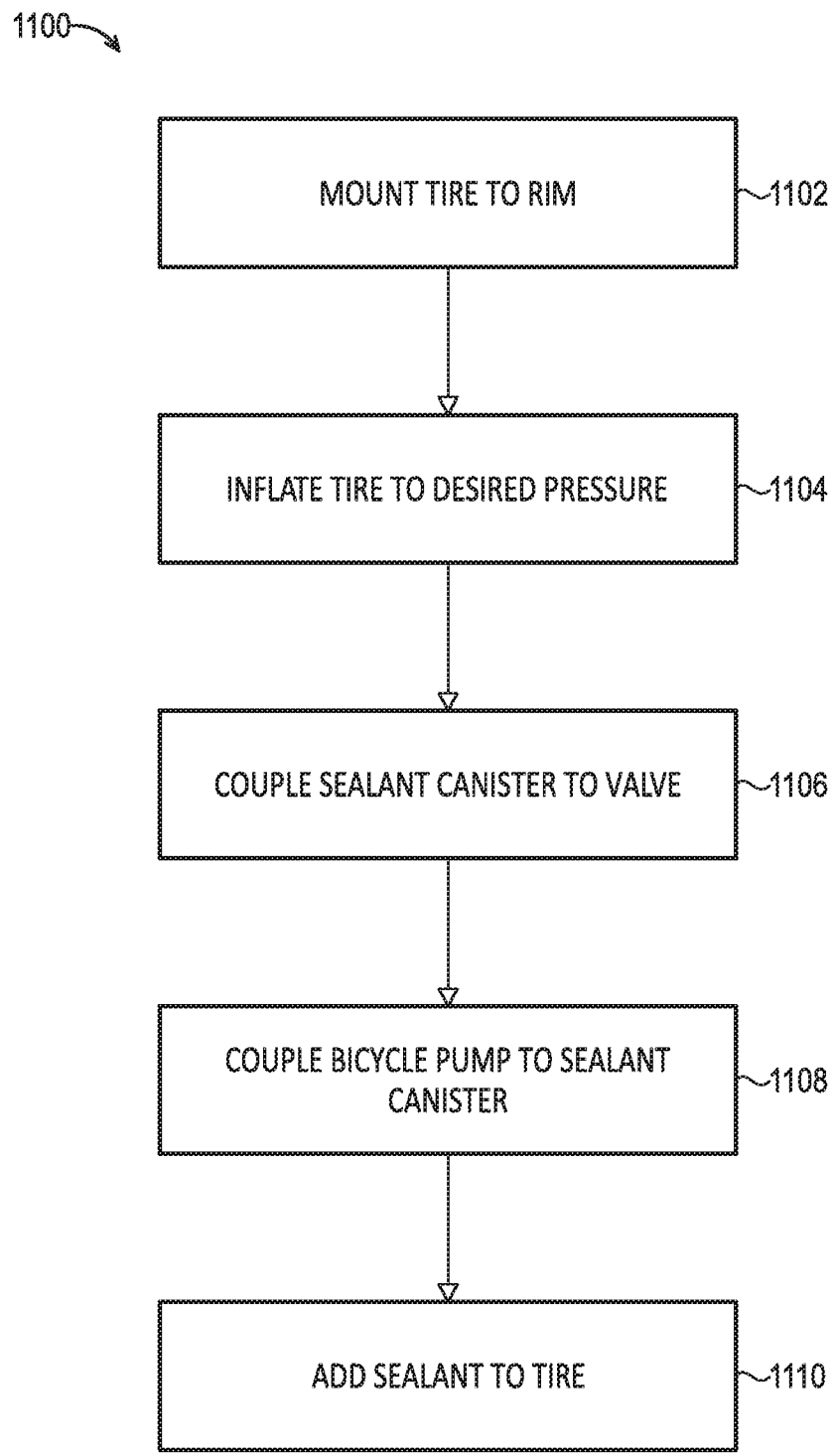
FIG. 40 is a flow chart depicting steps of an illustrative method for installing a tubeless bicycle tire.

This section describes steps of an illustrative method 1100 for installing a tubeless bicycle tire; see FIG. 40. Aspects of valve 100, valve 300, valve 310, valve 320, valve 330, valve 340, valve 350, valve 360, valve 370, valve 380, valve 390, valve 400, valve 410, valve 420, valve 430, valve 440, sealant canister 500, pump head 600, valve core adapter 700, valve core adapter 800, and/or inflation system 900 may be utilized in the method steps described below. Where appropriate, reference may be made to components and systems that may be used in carrying out each step. These references are for illustration, and are not intended to limit the possible ways of carrying out any particular step of the method.

FIG. 40 is a flowchart illustrating steps performed in an illustrative method, and may not recite the complete process or all steps of the method. Although various steps of method 1100 are described below and depicted in FIG. 40, the steps need not necessarily all be performed, and in some cases may be performed simultaneously or in a different order than the order shown.

Step 1102 of method 1100 includes mounting the tire to a rim. For tubeless tires, this process generally involves seating edges of the tire against flanges, ribs, or other containment features of the rim.

Step 1104 of method 1100 includes inflating the tire to a desired pressure. In some examples, this may involve determining a desired tire pressure after sealant has been added, determining an amount of pressure which will be added by the sealant addition step, and then inflating the tire to a pressure calculated to produce a desired pressure after both steps. In some examples, inflating the tire may include using a floor pump, pressurized air source, or other source of air pressure.

Step 1106 of method 1100 includes coupling a sealant canister to a bicycle valve installed in the rim. In some examples, the sealant canister may be substantially identical to sealant canister 500 and the valve may be substantially identical to valve 100. In some examples, step 1106 includes adding sealant to the sealant canister before coupling the canister to the bicycle valve. In some examples, coupling the sealant canister to the valve includes threading the canister onto the valve. In some examples, coupling the canister to the valve includes using a quick connect fitting to couple the canister to the valve. In some examples, coupling the canister to the valve includes using a push and twist connection to couple the canister to the valve.

Step 1008 of method 1100 includes coupling a bicycle pump to the sealant canister. In some examples, the bicycle pump includes a pump head substantially identical to pump head 600, and the sealant canister is substantially identical to canister 500. In some examples, coupling the bicycle pump to the sealant canister includes threading the pump head onto the canister. In some examples, coupling the bicycle pump to the canister includes using a quick connect fitting to couple the pump head to the canister. In some examples, coupling the bicycle pump to the canister includes using a push and twist connection to couple the pump head to the canister.

Step 1110 of method 1100 includes adding sealant to the tire. Adding sealant to the tire may include pressurizing the sealant canister by pumping the floor pump (e.g., 3-5 pumps) This may force sealant into the pressurized tire.

A method of adding sealant to an installed tubeless bicycle may include steps 1106 to 1110 of method 1110. In some examples, coupling a sealant canister to a valve may include releasing a volume of air from the valve prior to coupling the canister to the valve.

H. Illustrative Method for Disassembling a Bicycle Valve

Figure 41:
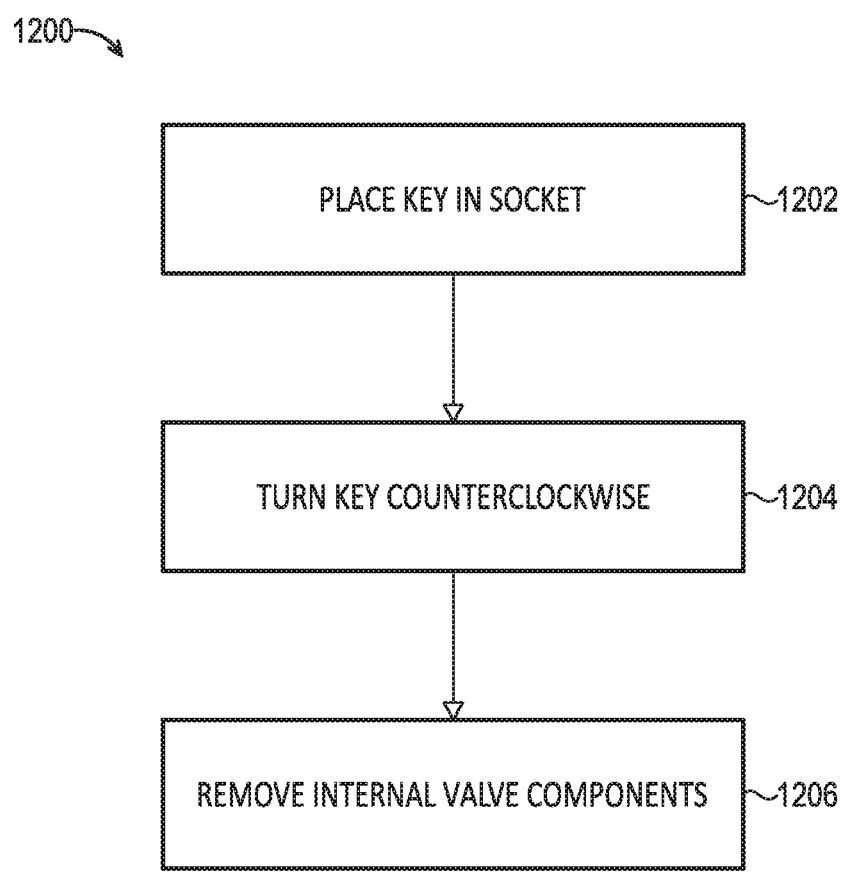
FIG. 41 is a flow chart depicting steps of an illustrative method for disassembling a tire valve.

This section describes steps of an illustrative method 1200 for disassembling a bicycle valve; see FIG. 41. Aspects of valve 100, valve 300, valve 310, valve 320, valve 330, valve 340, valve 350, valve 360, valve 370, valve 380, valve 390, valve 400, valve 410, valve 420, valve 430, and/or valve 440 may be utilized in the method steps described below. Where appropriate, reference may be made to components and systems that may be used in carrying out each step. These references are for illustration, and are not intended to limit the possible ways of carrying out any particular step of the method.

FIG. 41 is a flowchart illustrating steps performed in an illustrative method, and may not recite the complete process or all steps of the method. Although various steps of method 1200 are described below and depicted in FIG. 41, the steps need not necessarily all be performed, and in some cases may be performed simultaneously or in a different order than the order shown.

Step 1202 of method 1200 includes placing a key (e.g., a hex or Allen key) in a polygonal socket disposed on the valve, such as socket 128 of valve 100. In some examples, the polygonal socket may have any suitable shape, such as pentagonal, hexagonal, octagonal, star-shaped, and/or any suitable internal polygon. In some examples, the key or wrench may have any suitable shape corresponding to the shape of the polygonal socket. In some examples, the valve may not have a polygonal socket and may instead include a screw, nut, knurl, and/or any suitable external turning mechanism. In these examples, a socket wrench, wrench, screwdriver, no tool, or any suitable tool may be used.

Step 1204 of method 1200 includes turning the Allen key counterclockwise. This may unscrew internal valve components, such as threaded insert 164 of valve 100. In some examples, multiple valve components may be coupled together, such that turning one valve component may correspondingly remove and/or rotate multiple valve components. For example, in valve 100, polygonal socket 128 is disposed on valve stem 120. Valve stem 120 is coupled to threaded insert 164 by pin 162, so that rotating valve stem 120 rotates threaded insert 164.

Step 1206 of method 1200 includes removing internal valve components. Removing internal valve components may include sliding components through a hole disposed in a valve body. In some examples, valve components may be coupled together and may be removed together. In some examples, removing internal valve components may include removing individual valve components sequentially. The valve body may remain in a hole in the bicycle rim, or may be removed.

I. Illustrative Combinations and Additional Examples

This section describes additional aspects and features of inflation systems for tubeless tires, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An inflation valve for a tubeless tire, the valve comprising:

a valve body having a proximal end and an open distal end, and defining an internal cavity; and a valve stem extending continuously through the internal cavity, such that a threaded end of the valve stem protrudes beyond the open distal end of the valve body;

wherein the proximal end of the valve body comprises a valve seat (e.g., having an outer diameter larger than an inner diameter of the valve body), and a corresponding proximal end of the valve stem includes a resilient seating surface; and wherein the valve is configured to be transitionable between:

(a) a closed position, in which the resilient seating surface mates with the valve seat and seals the proximal end of the valve body, and the threaded end of the valve stem extends beyond the distal end of the valve body by a first distance, and (b) an open position, in which the resilient seating surface is spaced from the valve seat, and the threaded end of the valve stem extends beyond the distal end of the valve body by a second distance less than the first distance.

A1. The inflation valve of A0, further comprising a removable cap having internal threads configured to mate with the threaded end of the valve stem and a side wall configured to cover an end portion of the valve body when installed.

A2. The inflation valve of A1, wherein the cap further comprises a channel extending along an inner surface of the side wall and terminating an open end of the cap.

A3. The inflation valve of any one of paragraphs A0 through A2, wherein the resilient seating surface comprises an O-ring.

A4. The inflation valve of one of paragraphs A0 through A3, wherein the proximal end of the valve stem comprises a recess forming a polygonal socket.

A5. The inflation valve of any one of paragraphs A0 through A4, further comprising: a pin disposed in a fixed position across a width of the internal cavity, wherein the pin passes through a slot formed in the valve stem.

A6. The inflation valve of A5, further comprising: a threaded insert removably coupled to the proximal end of the valve body, the threaded insert including a first portion forming the valve seat and a second portion including a threaded outer surface and a pair of opposing apertures configured to receive the pin.

A7. The inflation valve of one of paragraphs A0 through A6, wherein the valve stem further includes a circumferential groove configured to receive a quick connect fitting.

A8. The inflation valve of one of paragraphs A0 through A7, wherein the valve stem is separable in to two portions.

B0. An inflation system for a tubeless tire, the system comprising an inflation valve including:

a valve body having an open proximal end and an open distal end, wherein a valve seat is formed at a periphery of the proximal end;

a valve stem extending coaxially through an internal cavity of the valve body, the valve stem including a threaded distal end protruding beyond the open distal end of the valve body; and a valve plug extending from a proximal end of the valve stem beyond the proximal end of the valve body, the valve plug including a resilient seating surface configured to mate with the valve seat;

wherein the valve stem is retained in the valve body by a transverse pin coupled to the valve body and passing through a slot formed in the valve stem.

B1. The inflation system of B0, further comprising an inflation pump head having a compressed air outlet portion including a quick connect collar configured to mate with a circumferential groove formed in an outer surface of the valve body.

B2. The inflation system of B1, further comprising a sealant canister having an air outlet configured to mate with the inflation valve and a quick connect inlet configured to mate with the compressed air outlet portion of the inflation pump head.

B3. The inflation system of any one of paragraphs B0 through B2, further comprising: a removable cap having internal threads configured to mate with the threaded distal end of the valve stem and a side wall configured to cover an end portion of the valve body when installed.

B4. The inflation system of B3, wherein the cap further comprises a channel extending along an inner surface of the side wall and terminating an open end of the cap.

B5. The inflation system of any one of paragraphs B0 through B4, wherein the valve seat has an outer diameter larger than an inner diameter of the valve body.

C0. A method of operation for a tire inflation valve, the method comprising:

partially unscrewing a valve cap installed on an inflation valve of a tubeless tire, the inflation valve including a valve body having an open proximal end and an open distal end, wherein a valve seat is formed at a periphery of the proximal end, a valve stem extending coaxially through an internal cavity of the valve body, the valve stem including a threaded distal end coupled to the valve cap, and a valve plug extending from a proximal end of the valve stem beyond the proximal end of the valve body, the valve plug including a resilient seating surface configured to mate with the valve seat, wherein the valve stem is retained in the valve body by a transverse pin coupled to the valve body and passing through a slot formed in the valve stem;

applying a generally axial force on the valve cap to cause the valve stem to travel toward the proximal end of the valve, such that the valve plug is unseated and air escapes through a resulting annular opening;

releasing the generally axial force from the valve cap, such that air pressure within the tire causes the valve to reseat; and locking the inflation valve by screwing the valve cap onto the valve stem until a portion of the valve cap abuts the distal end of the valve body.

C1. The method of C0, further comprising:

removing the valve cap from the inflation valve;

coupling a quick-connect air pump head to the valve by mating a collar of the pump head with a circumferential groove in the valve body; and adding air to the tire through the inflation valve.

C2. The method of C1, further comprising:
coupling the air pump head to a quick-connect compressed air inlet of a sealant canister containing sealant;
coupling an outlet of the sealant canister to the inflation valve; and
adding sealant to the tire through the inflation valve.

C3. The method of any one of paragraphs C0 through C2, further comprising:
disassembling the valve by unscrewing a threaded insert from the proximal end of the valve body, wherein the threaded insert includes a pair of opposing apertures holding the transverse pin.

C4. The method of C3, wherein the threaded insert further comprises the valve seat.

C5. The method of any one of paragraphs C0 through C4, wherein the valve cap is configured to convey air exiting from inside the valve body to an open end of the valve cap using a channel extending along an inner surface of a side wall of the valve cap.

C6. The method of any one of paragraphs C0 through C4, wherein the valve seat has an outer diameter larger than an inner diameter of the valve body.

Advantages, Features, and Benefits

The different embodiments and examples of the valve and related systems described herein provide several advantages over known solutions for inflating tubeless bicycle tires. For example, illustrative embodiments and examples described herein seals the valve body, preventing air from passing from the tire into the valve. This prevents sealant in the tire from clogging the valve.

Additionally, and among other benefits, illustrative embodiments and examples described herein have a larger internal diameter than typical bicycle valves (e.g., Presta valves or Schrader valves). This results in a higher air flow and reduced clogging, while the valve body still fits in a rim hole drilled for a Presta valve. Higher air flow makes seating a tire to a bicycle rim easier, improves pumping speed, and allows for the injection of sealant into the tire without the removal of a valve core. Higher air flow also eliminates the need for compressed air. The larger internal diameter also allows for rapid tire deflation.

Additionally, and among other benefits, illustrative embodiments and examples described herein allow for the connection of a valve and pump head using a quick connect interface. This interface does not require twisting or jerking of the tire valve, preventing rim damage, de-seating of the valve, and tire deflation.

Additionally, and among other benefits, illustrative embodiments and examples described herein allow valve disassembly for cleaning purposes.

Additionally, and among other benefits, illustrative embodiments and examples described herein are compatible with standard pump heads (e.g., clamp-on and threaded).

Additionally, and among other benefits, illustrative embodiments and examples described herein are compatible with tubeless bicycle rims and standard rims.

Additionally, and among other benefits, illustrative embodiments and examples described herein allow for the release of air from the tire without removing the valve cap.

Additionally, and among other benefits, illustrative embodiments and examples described herein may provide stronger seals than conventional bicycle pump connections, allowing for higher air pressures.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method of operation for an inflation valve, the method comprising:
partially unscrewing a valve cap installed on the inflation valve of a tubeless tire, the inflation valve including a valve body having an open proximal end and an open distal end, wherein a valve seat is formed at a periphery of the proximal end, a valve stem extending coaxially through an internal cavity of the valve body, the valve stem including a threaded distal end coupled to the valve cap, and a valve plug extending from a proximal end of the valve stem beyond the proximal end of the valve body, the valve plug including a resilient seating surface configured to mate with the valve seat, wherein the valve stem is retained in the valve body by a transverse pin coupled to the valve body and passing through a slot formed in the valve stem;
applying a generally axial force on the valve cap to cause the valve stem to travel toward the proximal end of the inflation valve, such that the valve plug is unseated and air escapes through a resulting annular opening;
releasing the generally axial force from the valve cap, such that air pressure within the tire causes the inflation valve to reseat; and
locking the inflation valve by screwing the valve cap onto the valve stem until a portion of the valve cap abuts the distal end of the valve body.

2. The method of claim 1, further comprising:
removing the valve cap from the inflation valve;
coupling a quick-connect air pump head to the inflation valve by mating a collar of the pump head with a circumferential groove in the inflation valve body; and
adding air to the tire through the inflation valve.

3. The method of claim 2, further comprising:
coupling the air pump head to a quick-connect compressed air inlet of a sealant canister containing sealant;
coupling an outlet of the sealant canister to the inflation valve; and
adding sealant to the tire through the inflation valve.

4. The method of claim 1, further comprising:
disassembling the inflation valve by unscrewing a threaded insert from the proximal end of the valve body, wherein the threaded insert includes a pair of opposing apertures holding the transverse pin.

5. The method of claim 4, wherein the threaded insert further comprises the valve seat.

6. The method of claim 1, wherein the valve cap is configured to convey air exiting from inside the valve body to an open end of the valve cap using a channel extending along an inner surface of a side wall of the valve cap.

7. An inflation valve for a tubeless tire, the valve comprising:
a valve body having a proximal end and an open distal end, and defining an internal cavity;
a valve stem extending continuously through the internal cavity, such that a threaded end of the valve stem protrudes beyond the open distal end of the valve body; and
a pin disposed in a fixed position across a width of the internal cavity, wherein the pin passes through a slot formed in the valve stem;
wherein the proximal end of the valve body comprises a valve seat having an outer diameter larger than an inner diameter of the valve body, and a corresponding proximal end of the valve stem includes a resilient seating surface; and
wherein the valve is configured to be transitionable between:
(a) a closed position, in which the resilient seating surface mates with the valve seat and seals the proximal end of the valve body, and the threaded end of the valve stem extends beyond the distal end of the valve body by a first distance, and
(b) an open position, in which the resilient seating surface is spaced from the valve seat, and the threaded end of the valve stem extends beyond the distal end of the valve body by a second distance less than the first distance.

8. The inflation valve of claim 7, further comprising:
a removable cap having internal threads configured to mate with the threaded end of the valve stem and a side wall configured to cover an end portion of the valve body when installed.

9. The inflation valve of claim 8, wherein the cap further comprises a channel extending along an inner surface of the side wall and terminating an open end of the cap.

10. The inflation valve of claim 7, wherein the resilient seating surface comprises an O-ring.

11. The inflation valve of claim 7, wherein the proximal end of the valve stem comprises a recess forming a polygonal socket.

12. The inflation valve of claim 7, further comprising:
a threaded insert removably coupled to the proximal end of the valve body, the threaded insert including a first portion forming the valve seat and a second portion including a threaded outer surface and a pair of opposing apertures configured to receive the pin.

13. The inflation valve of claim 7, wherein the valve stem further includes a circumferential groove configured to receive a quick connect fitting.

14. An inflation system for a tubeless tire, the system comprising:
an inflation valve including:
a valve body having an open proximal end and an open distal end, wherein a valve seat is formed at a periphery of the proximal end;
a valve stem extending coaxially through an internal cavity of the valve body, the valve stem including a threaded distal end protruding beyond the open distal end of the valve body; and
a valve plug extending from a proximal end of the valve stem beyond the proximal end of the valve body, the valve plug including a resilient seating surface configured to mate with the valve seat;
wherein the valve stem is retained in the valve body by a transverse pin coupled to the valve body and passing through a slot formed in the valve stem.

15. The inflation system of claim 14, further comprising an inflation pump head having a compressed air outlet portion including a quick connect collar configured to mate with a circumferential groove formed in an outer surface of the valve body.

16. The inflation system of claim 15 further comprising a sealant canister having an air outlet configured to mate with the inflation valve and a quick connect inlet configured to mate with the compressed air outlet portion of the inflation pump head.

17. The inflation system of claim 14, further comprising:
a removable cap having internal threads configured to mate with the threaded distal end of the valve stem and a side wall configured to cover an end portion of the valve body when installed.

18. The inflation system of claim 17, wherein the cap further comprises a channel extending along an inner surface of the side wall and terminating an open end of the cap.

* * * * *